(12) United States Patent
Gupta et al.

(10) Patent No.: US 12,526,102 B2
(45) Date of Patent: Jan. 13, 2026

(54) FRAME STRUCTURE FOR SYNCHRONOUS OPERATION OF AN AMBIENT INTERNET-OF-THINGS DEVICE

(71) Applicant: QUALCOMM Incorporated, San Diego, CA (US)

(72) Inventors: Piyush Gupta, Bridgewater, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 18/167,377

(22) Filed: Feb. 10, 2023

(65) Prior Publication Data

US 2024/0275542 A1   Aug. 15, 2024

(51) Int. Cl.
*H04L 5/00* (2006.01)
*H03M 5/12* (2006.01)
*H04L 1/00* (2006.01)
*H04W 72/0446* (2023.01)
*H04W 72/1268* (2023.01)

(52) U.S. Cl.
CPC ............ *H04L 5/0048* (2013.01); *H03M 5/12* (2013.01); *H04L 1/0009* (2013.01); *H04W 72/0446* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 7,027,773 B1 * | 4/2006 | McMillin | H04L 45/00 |
| | | | 455/445 |
| 10,790,959 B1 * | 9/2020 | Yen | H03L 7/099 |
| 11,864,130 B1 * | 1/2024 | Chrabieh | H04B 17/318 |
| 2004/0052528 A1 * | 3/2004 | Halgren | H04L 25/4904 |
| | | | 398/47 |
| 2007/0177694 A1 * | 8/2007 | Okunev | H04L 27/14 |
| | | | 375/333 |
| 2008/0278293 A1 * | 11/2008 | Drucker | G06K 7/0008 |
| | | | 340/10.4 |
| 2014/0328199 A1 | 11/2014 | Matischek et al. | |
| 2018/0041936 A1 * | 2/2018 | Kim | H04W 72/51 |
| 2018/0075265 A1 * | 3/2018 | Zhu | G06K 7/10297 |
| 2018/0124744 A1 * | 5/2018 | Xue | H04L 5/0094 |
| 2019/0114451 A1 * | 4/2019 | Armstrong | G06K 7/10227 |
| 2020/0136783 A1 * | 4/2020 | Takeda | H04L 5/0055 |
| 2021/0211343 A1 * | 7/2021 | Baldemair | H04W 72/1263 |
| 2021/0345269 A1 * | 11/2021 | Li | H04W 56/0015 |

(Continued)

OTHER PUBLICATIONS

International Search Report and Written Opinion—PCT/US2023/084425—ISA/EPO—Apr. 15, 2024, 10 Pages.

*Primary Examiner* — Lonnie V Sweet
(74) *Attorney, Agent, or Firm* — Harrity & Harrity, LLP

(57) ABSTRACT

Various aspects of the present disclosure generally relate to wireless communication. In some aspects, an ambient Internet-of-Things (IoT) device may receive configuration information indicating resources associated with an uplink trigger message that initiates a communication session between the ambient IoT device and a network device. The ambient IoT device may transmit the uplink trigger message to the network device using the resources associated with the uplink trigger message. Numerous other aspects are described.

30 Claims, 12 Drawing Sheets

(56) References Cited

U.S. PATENT DOCUMENTS

| | | | | |
|---|---|---|---|---|
| 2022/0124832 A1* | 4/2022 | Bae | ........................ | H04L 5/0078 |
| 2022/0174676 A1* | 6/2022 | Huang | ................ | G06K 7/10069 |
| 2022/0337466 A1* | 10/2022 | Barton | ................ | H04L 27/2607 |
| 2022/0377683 A1* | 11/2022 | Myung | ............. | H04W 74/0816 |
| 2022/0390393 A1* | 12/2022 | Yan | ................... | H04L 27/26025 |
| 2023/0142550 A1* | 5/2023 | Polehn | .................. | H04L 5/1438 |
| | | | | 370/280 |
| 2024/0205892 A1* | 6/2024 | Yamamoto | ........ | H04W 72/0446 |
| 2025/0056516 A1* | 2/2025 | Takano | ................. | H04W 48/18 |
| 2025/0071682 A1* | 2/2025 | Wong | ............... | H04W 52/0235 |

* cited by examiner

FRAME STRUCTURE FOR SYNCHRONOUS OPERATION OF AN AMBIENT INTERNET-OF-THINGS DEVICE

FIELD OF THE DISCLOSURE

Aspects of the present disclosure generally relate to wireless communication and to techniques and apparatuses for a frame structure for synchronous operation of an ambient Internet-of-Things device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an ambient Internet-of-Things (IoT) device. The method may include receiving configuration information indicating resources associated with an uplink trigger message that initiates a communication session between the ambient IoT device and a network device. The method may include transmitting the uplink trigger message to the network device using the resources associated with the uplink trigger message.

Some aspects described herein relate to a method of wireless communication performed by a network device. The method may include transmitting, to an ambient IoT device, configuration information indicating resources associated with an uplink trigger message that initiates a communication session between the ambient IoT device and the network device. The method may include receiving, from the ambient IoT device, the uplink trigger message using the resources associated with the uplink trigger message.

Some aspects described herein relate to an ambient IoT device for wireless communication. The ambient IoT device may include a memory and one or more processors coupled to the memory. The one or more processors may be configured to receive configuration information indicating resources associated with an uplink trigger message that initiates a communication session between the ambient IoT device and a network device. The one or more processors may be configured to transmit the uplink trigger message to the network device using the resources associated with the uplink trigger message.

Some aspects described herein relate to a network device for wireless communication. The network device may include a memory and one or more processors coupled to the memory. The one or more processors may be configured to transmit, to an ambient IoT device, configuration information indicating resources associated with an uplink trigger message that initiates a communication session between the ambient IoT device and the network device. The one or more processors may be configured to receive, from the ambient IoT device, the uplink trigger message using the resources associated with the uplink trigger message.

Some aspects described herein relate to a non-transitory computer-readable medium that stores one or more instructions for wireless communication by an ambient IoT device. The one or more instructions, when executed by one or more processors of the ambient IoT device, may cause the ambient IoT device to receive configuration information indicating resources associated with an uplink trigger message that initiates a communication session between the ambient IoT device and a network device. The one or more instructions, when executed by one or more processors of an ambient IoT device, may cause the ambient IoT device to transmit the uplink trigger message to the network device using the resources associated with the uplink trigger message.

Some aspects described herein relate to a non-transitory computer-readable medium that stores one or more instructions for wireless communication by a network device. The one or more instructions, when executed by one or more processors of the network device, may cause the network device to transmit, to an ambient IoT device, configuration information indicating resources associated with an uplink trigger message that initiates a communication session between the ambient IoT device and the network device. The one or more instructions, when executed by one or more processors of the network device, may cause the network device to receive, from the ambient IoT device, the uplink trigger message using the resources associated with the uplink trigger message.

Some aspects described herein relate to an apparatus for wireless communication. The apparatus may include means for receiving configuration information indicating resources associated with an uplink trigger message that initiates a communication session between the apparatus and a network device. The apparatus may include means for transmitting the uplink trigger message to the network device using the resources associated with the uplink trigger message.

Some aspects described herein relate to an apparatus for wireless communication. The apparatus may include means for transmitting, to an ambient IoT device, configuration information indicating resources associated with an uplink trigger message that initiates a communication session between the ambient IoT device and the apparatus. The apparatus may include means for receiving, from the ambient IoT device, the uplink trigger message using the resources associated with the uplink trigger message.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
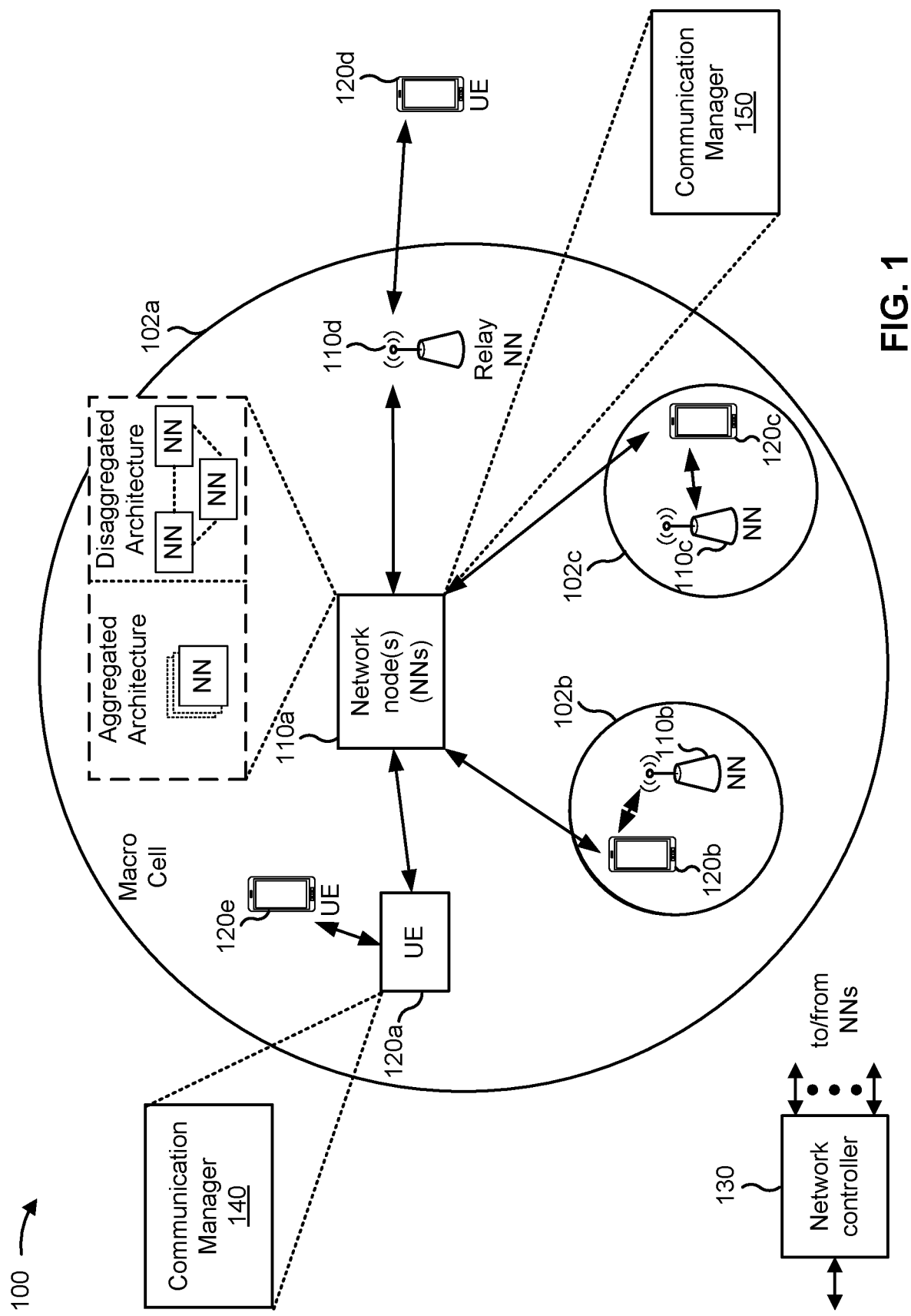
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some cases, an ambient Internet-of-Things (IoT) device (sometimes referred to as an ultra-light IoT device) may be used to communicate with a network device. An ambient IoT device may be an IoT device that is capable of transmitting an uplink trigger message, and thus may initiate a communication session with a network device from the IoT device side. An ambient IoT device may be associated with uplink transmissions that do not utilize a power amplifier (PA) (e.g., a transmission in the range of 0 to 5 dBm), and for which there is limited transmission capability, such as an ability to simply transmit a preamble transmission to indicate uplink traffic. Such ambient IoT devices may use asynchronous operation, which may result in high error rates, missed communications, and otherwise high power consumption to correct communication errors and/or retransmit missed messages. There thus remains a need to efficiently support synchronous operation of an ambient IoT device.

Some techniques and apparatuses described herein enable a frame structure to support synchronous operation of an ambient IoT device. In some aspects, the frame structure may include resources associated with a primary synchronization signal (PSS), a secondary synchronization signal (SSS), a physical broadcast channel (PBCH), a downlink channel, an uplink channel, and/or an uplink trigger message. For example, the frame structure may include resources associated with the uplink trigger message that occur at a fixed relative location with respect to resources associated with the PSS. In that regard, an ambient IoT device or similar device may acquire network timing from a PSS and transmit the uplink trigger message to a network device using the resources associated with the uplink trigger message, which may initiate a communication session between the ambient IoT device and the network device. As a result, some techniques and apparatuses described herein enable efficient, synchronous operation of ambient IoT devices, thereby reducing power, computing, and communication resource consumption associated with other IoT devices and/or enabling long-range, high-density IoT device communication.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered IoT devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, an ambient IoT device described elsewhere herein may correspond to the UE 120. Additionally, or alternatively, the ambient IoT device may include a communication manager 140. As described in more detail elsewhere herein, the communication manager 140 may receive configuration information indicating resources associated with an uplink trigger message that initiates a communication session between the ambient IoT device and a network device; and transmit the uplink trigger message to the network device using the resources associated with the uplink trigger message. Additionally, or alternatively, the communication manager 140 may perform one or more other operations described herein.

In some aspects, a network device described elsewhere herein may correspond to the network node 110. Additionally, or alternatively, the network device may include a communication manager 150. As described in more detail elsewhere herein, the communication manager 150 may transmit, to an ambient IoT device, configuration information indicating resources associated with an uplink trigger message that initiates a communication session between the ambient IoT device and the network device; and receive, from the ambient IoT device, the uplink trigger message using the resources associated with the uplink trigger message. Additionally, or alternatively, the communication manager 150 may perform one or more other operations described herein.

As indicated above, FIG. 1 is provided as an example. Other examples may differ from what is described with regard to FIG. 1.

Figure 2:
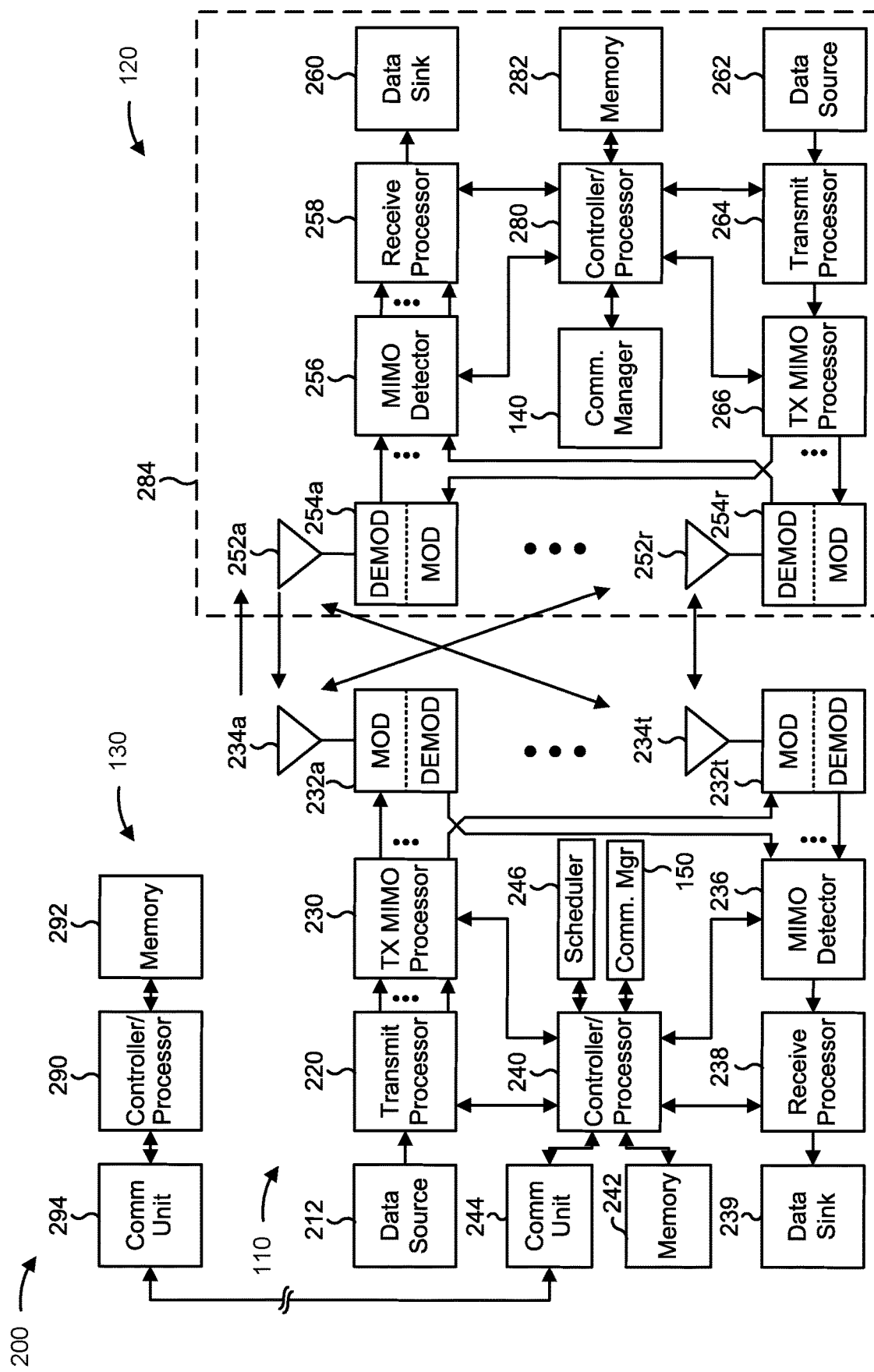
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a PSS or an SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the network node 110, the controller/processor 280 of the UE 120, and/or any other component(s) of FIG. 2 may perform one or more techniques associated with a frame structure for synchronous operation of an ambient IoT device, as described in more detail elsewhere herein. In some aspects, the network device described herein is the network node 110, is included in the network node 110, or includes one or more components of the network node 110 shown in FIG. 2. Moreover, in some aspects, the ambient IoT device described herein is the UE 120, is included in the UE 120, or includes one or more components of the UE 120 shown in FIG. 2. The controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the ambient IoT device includes means for receiving configuration information indicating resources associated with an uplink trigger message that initiates a communication session between the ambient IoT device and a network device; and/or means for transmitting the uplink trigger message to the network device using the resources associated with the uplink trigger message. In some aspects, the means for the ambient IoT to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network device includes means for transmitting, to an ambient IoT device, configuration information indicating resources associated with an uplink trigger message that initiates a communication session between the ambient IoT device and the network device; and/or means for receiving, from the ambient IoT device, the uplink trigger message using the resources associated with the uplink trigger message. In some aspects, the means for the network device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an JAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
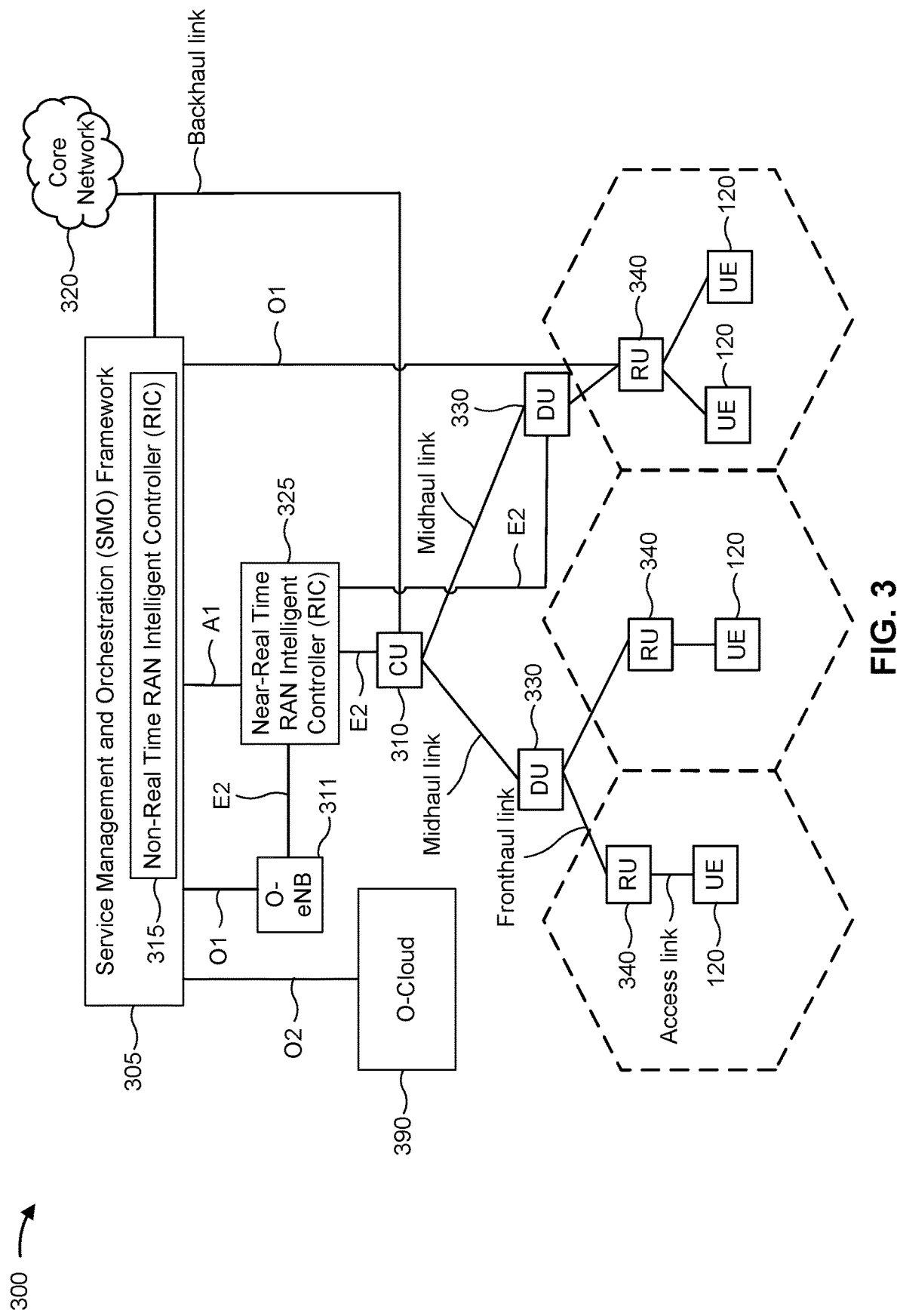
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
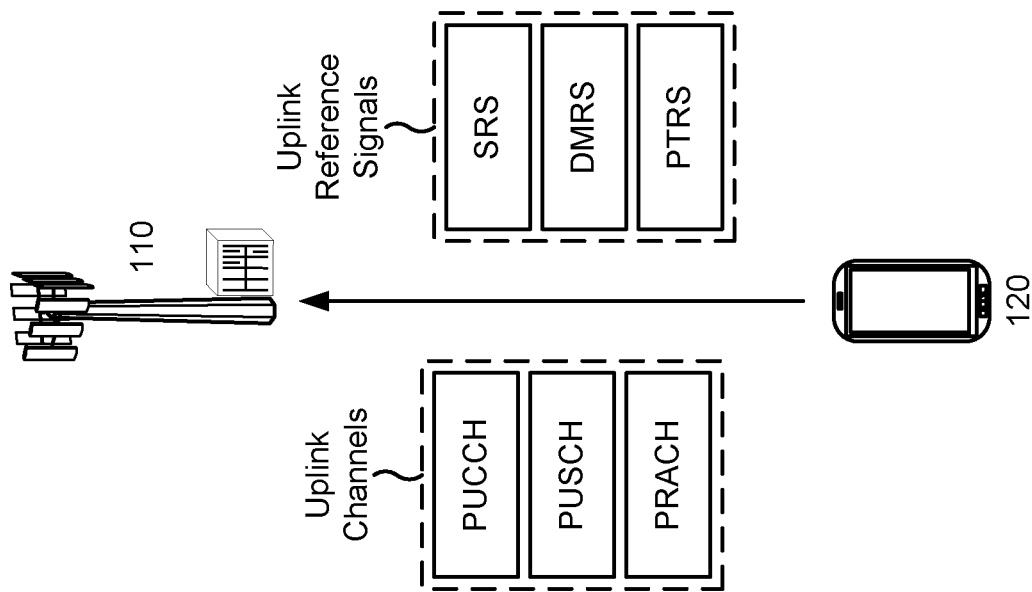
FIG. 4 is a diagram illustrating an example of physical channels and reference signals in a wireless network, in accordance with the present disclosure.
Figure 4:
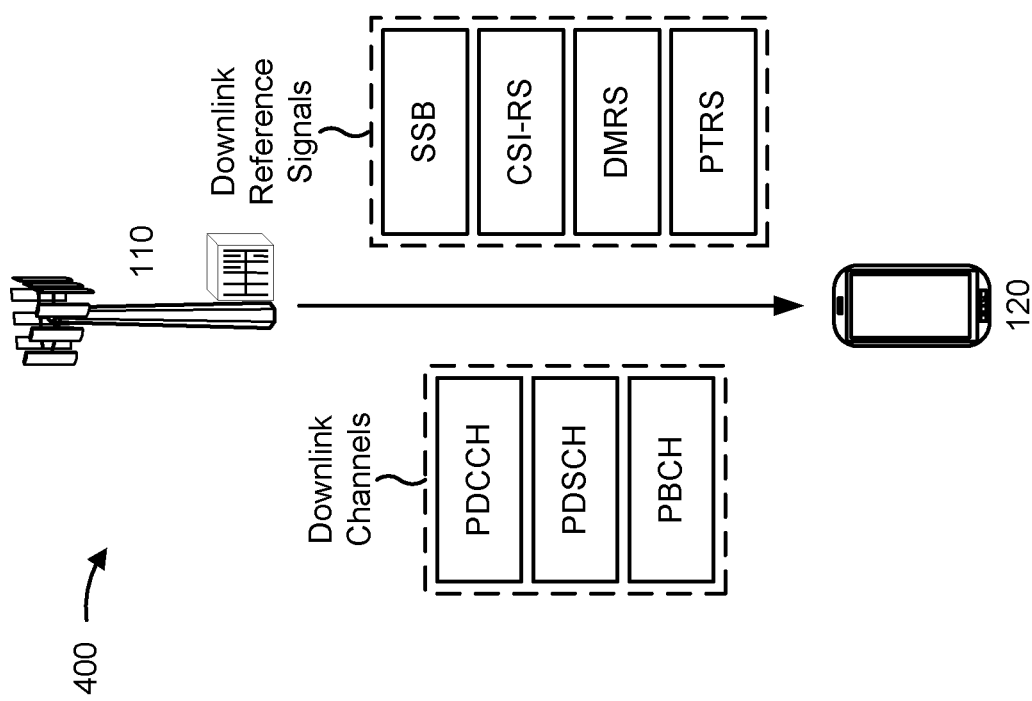

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a PBCH that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection. Aspects of an SSB are described in more detail below in connection with FIG. 5.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or a RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
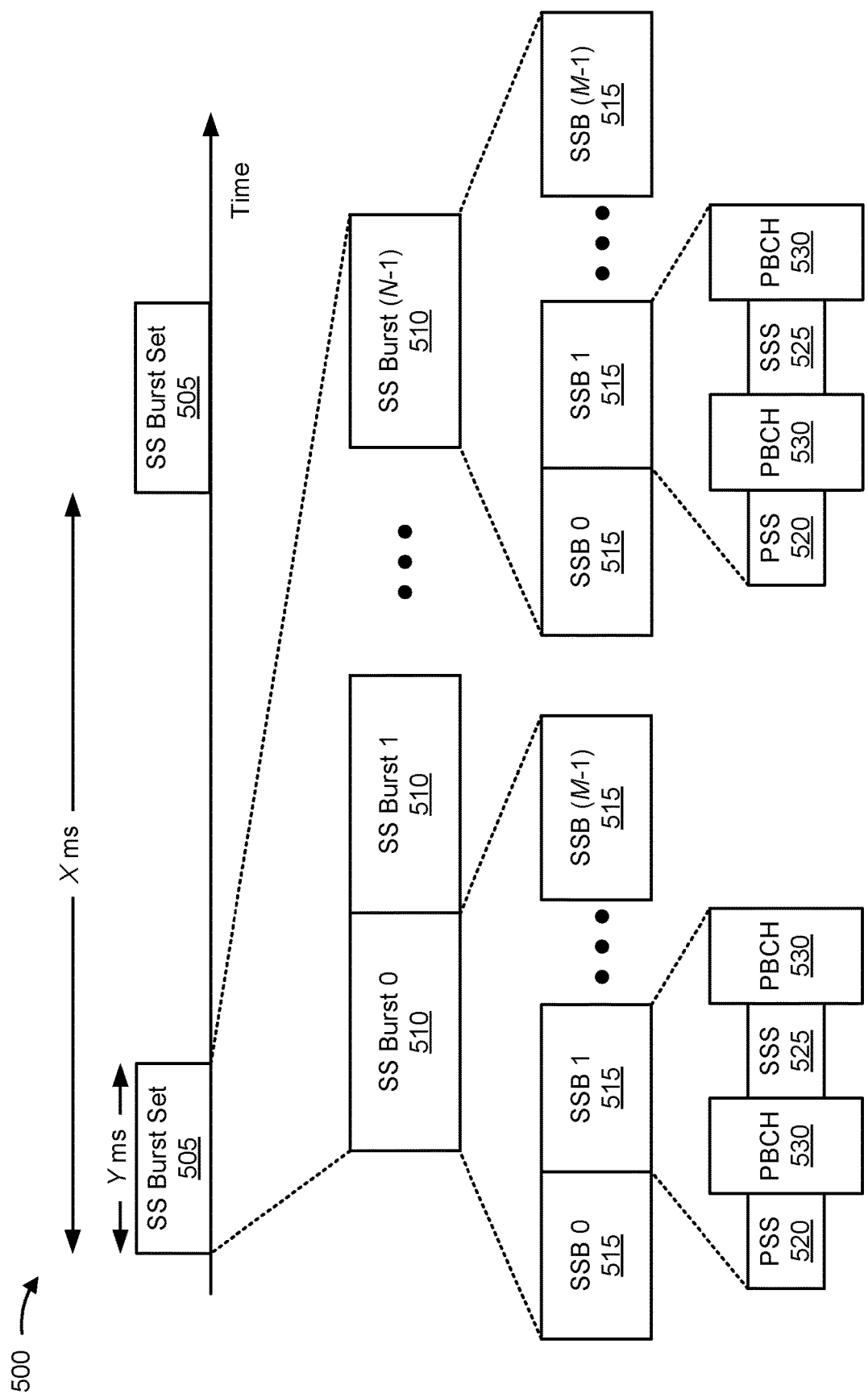
FIG. 5 is a diagram illustrating an example of a synchronization signal hierarchy, in accordance with the present disclosure.

FIG. 5 is a diagram illustrating an example 500 of a synchronization signal (SS) hierarchy, in accordance with the present disclosure. As shown in FIG. 5, the SS hierarchy may include an SS burst set 505, which may include multiple SS bursts 510, shown as SS burst 0 through SS burst N−1, where N is a maximum number of repetitions of the SS burst 510 that may be transmitted by one or more network nodes. As further shown, each SS burst 510 may include one or more SSBs 515, shown as SSB 0 through SSB M−1, where M is a maximum number of SSBs 515 that can be carried by an SS burst 510. In some aspects, different SSBs 515 may be beam-formed differently (e.g., transmitted using different beams), and may be used for cell search, cell acquisition, beam management, and/or beam selection (e.g., as part of an initial network access procedure). An SS burst set 505 may be periodically transmitted by a wireless node (e.g., a network node 110), such as every X milliseconds, as shown in FIG. 5. In some aspects, an SS burst set 505 may have a fixed or dynamic length, shown as Y milliseconds in FIG. 5. In some cases, an SS burst set 505 or an SS burst 510 may be referred to as a discovery reference signal (DRS) transmission window or an SSB measurement time configuration (SMTC) window.

In some aspects, an SSB 515 may include resources that carry a PSS 520, an SSS 525, and/or a PBCH 530. In some aspects, multiple SSBs 515 are included in an SS burst 510 (e.g., with transmission on different beams), and the PSS 520, the SSS 525, and/or the PBCH 530 may be the same across each SSB 515 of the SS burst 510. In some aspects, a single SSB 515 may be included in an SS burst 510. In some aspects, the SSB 515 may be at least four symbols (e.g., OFDM symbols) in length, where each symbol carries one or more of the PSS 520 (e.g., occupying one symbol), the SSS 525 (e.g., occupying one symbol), and/or the PBCH 530 (e.g., occupying two symbols). In some aspects, an SSB 515 may be referred to as an SS/PBCH block.

In some aspects, the symbols of an SSB 515 are consecutive, as shown in FIG. 5. In some aspects, the symbols of an SSB 515 are non-consecutive. Similarly, in some aspects, one or more SSBs 515 of the SS burst 510 may be transmitted in consecutive radio resources (e.g., consecutive symbols) during one or more slots. Additionally, or alternatively, one or more SSBs 515 of the SS burst 510 may be transmitted in non-consecutive radio resources.

In some aspects, the SS bursts 510 may have a burst period, and the SSBs 515 of the SS burst 510 may be transmitted by a wireless node (e.g., a network node 110) according to the burst period. In this case, the SSBs 515 may be repeated during each SS burst 510. In some aspects, the SS burst set 505 may have a burst set periodicity, whereby the SS bursts 510 of the SS burst set 505 are transmitted by the wireless node according to the fixed burst set periodicity. In other words, the SS bursts 510 may be repeated during each SS burst set 505.

In some aspects, an SSB 515 may include an SSB index, which may correspond to a beam used to carry the SSB 515. A UE 120 may monitor for and/or measure SSBs 515 using different receive (Rx) beams during an initial network access procedure and/or a cell search procedure, among other examples. Based at least in part on the monitoring and/or measuring, the UE 120 may indicate one or more SSBs 515 with a best signal parameter (e.g., an RSRP parameter) to a network node 110 (e.g., directly or via one or more other network nodes). The network node 110 and the UE 120 may use the one or more indicated SSBs 515 to select one or more beams to be used for communication between the network node 110 and the UE 120 (e.g., for a random access channel (RACH) procedure). Additionally, or alternatively, the UE 120 may use the SSB 515 and/or the SSB index to determine a cell timing for a cell via which the SSB 515 is received (e.g., a serving cell).

As indicated above, FIG. 5 is provided as an example. Other examples may differ from what is described with regard to FIG. 5.

Figure 6:
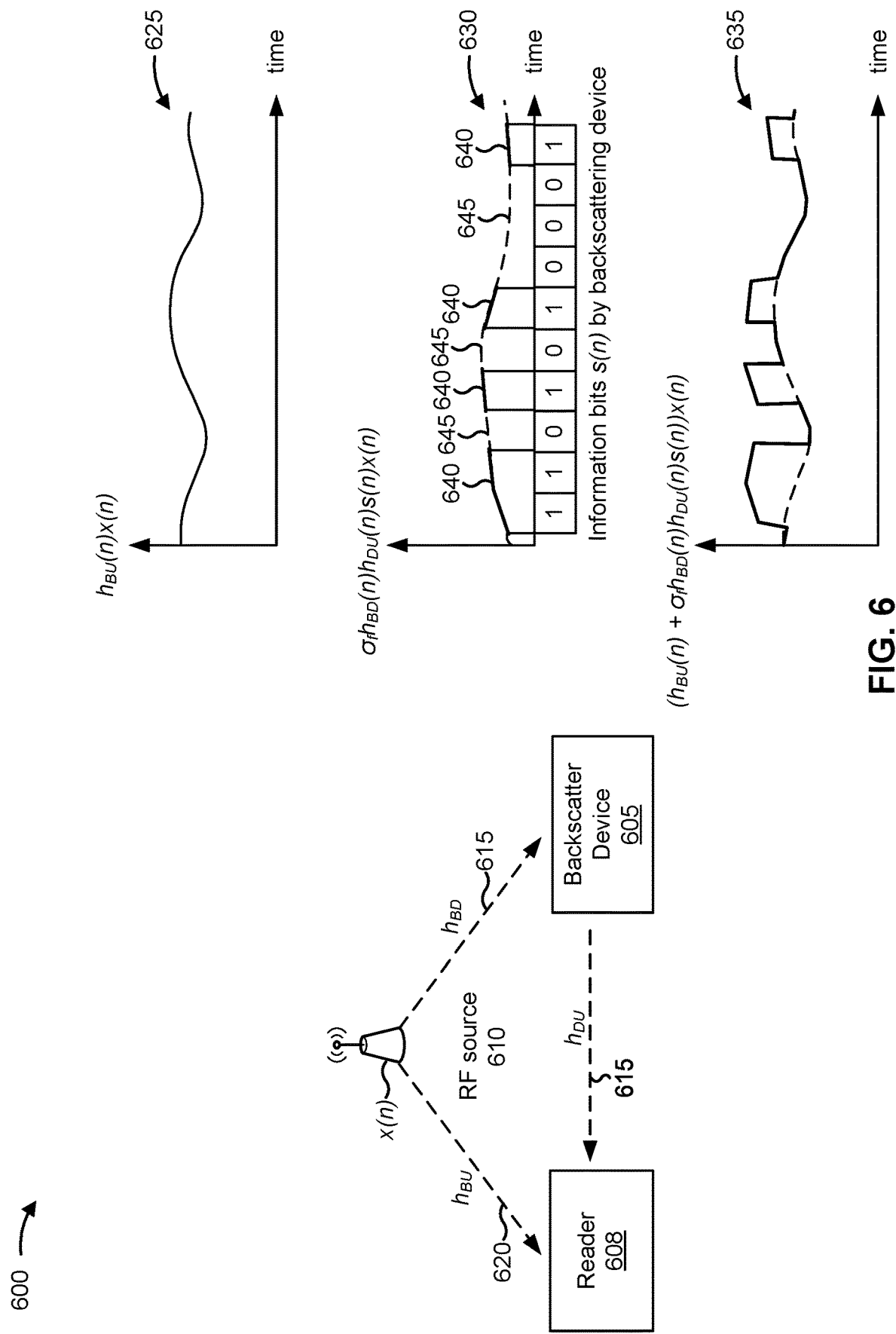
FIG. 6 is a diagram illustrating an example associated with backscatter communications, in accordance with the present disclosure.

FIG. 6 is a diagram illustrating an example 600 associated with backscatter communications, in accordance with the present disclosure.

Some wireless communication devices may be considered IoT devices, such as ambient IoT devices (sometimes referred to as ultra-light IoT devices), or similar IoT devices. IoT technology may include passive IoT (e.g., NR passive IoT for 5G Advanced), semi-passive IoT, ultra-light IoT, or ambient IoT, among other examples. In passive IoT, a terminal (e.g., a radio frequency identification (RFID) device, a tag, or a similar device) may not include a battery, and the terminal may accumulate energy from radio signaling. Additionally, the terminal may accumulate solar energy to supplement accumulated energy from radio signaling. In passive IoT, a communication distance may be up to 30 meters (or more) to facilitate feasible network coverage over a large area (e.g., 5000 square meters), such as in a warehouse. Moreover, the power consumption of a passive IoT terminal (e.g., a UE) may be less than 0.1 milliwatts (mW) to support operation without a battery, and the terminal may be relatively inexpensive to facilitate cost-sensitive uses. A positioning accuracy of a passive IoT terminal may be approximately 3-5 meters in the horizontal and the vertical directions.

Passive IoT may be useful in connection with industrial sensors, for which battery replacement may be prohibitively difficult or undesirable (e.g., for safety monitoring or fault detection in smart factories, infrastructures, or environments). Additionally, features of passive IoT devices, such as low cost, small size, maintenance-free, durable, long lifespan, or the like, may facilitate smart logistics/warehousing (e.g., in connection with automated asset management by replacing RFID tags). Furthermore, passive IoT may be useful in connection with smart home networks for household item management, wearable devices (e.g., wearable devices for medical monitoring for which patients do not need to replace batteries), and/or environment monitoring. To achieve further cost reduction and zero-power communication, 5G+/6G wireless networks may utilize a type of passive IoT device referred to as an "ambient backscatter device" or a "backscatter device."

As shown in FIG. 6, a backscatter device 605 (e.g., a tag, a sensor, or the like), which may be one example of a passive IoT device, may employ a simplified hardware design (e.g., including a power splitter, an energy harvester, and a microcontroller) that does not include a battery, such that the backscatter device 605 relies on energy harvesting for power, and that does not include a radio wave generation circuit, such that the backscatter device 605 is capable of transmitting information only by reflecting a radio wave. More particularly, the backscatter device 605 communicates with a reader 608 (e.g., a UE 120, a network node 110, or another network device) by modulating a reflecting radio signal from an RF source 610 (e.g., a network node 110, a UE 120, or another network device). In some examples, the RF source 610 and the reader 608 may be the same device and/or may be co-located. For example, in some cases, the reader 608 and the RF source 610 may be associated with the same network node 110.

To facilitate communication of the backscatter device 605, the RF source 610 may transmit an energy harvesting wave to the backscatter device 605. The energy harvesting wave may be transmitted for a sufficient duration in order to enable a communication phase for a target range between the reader 608 and the backscatter device 605. Additionally, or alternatively, in some cases, a range between the RF source 610 and the backscatter device 605 may be limited by a minimum received power for triggering energy harvesting at the backscatter device 605, such as −20 decibel milliwatts (dBm).

Once energy is sufficiently accumulated at the backscatter device 605, the backscatter device 605 may begin to reflect the radio wave that is radiated onto the backscatter device 605 via a backscatter link 615. For example, the RF source 610 may initiate a communication session (sometimes referred to as a query-response communication) with a query, which may be a modulating envelope of a continuous wave (CW). The backscatter device 605 may respond by backscattering of the CW. The communication session may include multiple rounds, such as for purposes of contention resolution when multiple backscatter devices respond to a query. A channel between the RF source 610 and the backscatter device 605 of the backscatter link 615 may be associated with a first backscatter link channel response value (sometimes referred to as a first backscatter link channel coefficient or a first backscatter link gain value), $h_{BD}$. As described below, the backscatter device 605 may have reflection-on periods and reflection-off periods that follow a pattern that is based at least in part on the transmission of information bits by the backscatter device 605. The reader 608 may detect the reflection pattern of the backscatter device 605 and obtain the backscatter communication information via the backscatter link 615. A channel between the reader 608 and the backscatter device 605 of the backscatter link 615 may be associated with a second backscatter link channel response value (sometimes referred to as a second backscatter link channel coefficient or a second backscatter link channel gain value), $h_{DU}$. In addition, the RF source 610 and the reader 608 may communicate (e.g., reference signals and/or data signals) via a direct link 620. A channel between the RF source 610 and the reader 608 of the direct link 620 may be associated with a direct link channel response value (sometimes referred to as a direct link channel coefficient or a direct link channel gain value), $h_{BU}$.

The backscatter device 605 may use an information modulation scheme, such as amplitude shift keying (ASK) modulation or on-off keying (OOK) modulation. For ASK or OOK modulation, the backscatter device 605 may switch on reflection when transmitting an information bit "1" and switch off reflection when transmitting an information bit "0." In backscatter communication, the RF source 610 may transmit a particular radio wave (e.g., a reference signal or a data signal, such as a PDSCH), which may be denoted as x(n). The reader 608 may receive this radio wave, x(n), directly from the RF source 610 via the direct link 620, as well as from the backscatter device 605 modulating and reflecting the radio wave to the reader 608 via the backscatter link 615. The signal received at the reader 608 via the direct link 620, denoted as $h_{BU}(n)x(n)$ and indicated by reference number 625, is the product of the radio wave transmitted by the RF source 610, x(n), multiplied by the direct link channel response value, $h_{BU}$, plus any signal noise. The information bits signal of the backscatter device 605 may be denoted as s(n) where $s(n) \in \{0,1\}$. Accordingly, the signal received at the reader 608 via the backscatter link 615, denoted as $\sigma_s h_{BD}(n) h_{DU}(n) s(n) x(n)$ and indicated by reference number 630, is the product of the signal transmitted by the RF source 610, x(n), multiplied by the first backscatter link channel response value, $h_{BD}$, the second backscatter link channel response value, $h_{DU}$, the information bits signal from the backscatter device 605, s(n), and a reflection coefficient associated with the backscatter device 605, $\sigma_f$, plus any noise.

Thus, the resulting signal received at the reader 608, which is the superposition of the signal received via the direct link 620 and the signal received via the backscatter link 615, may be denoted as y(n) where y(n)=($h_{BU}$(n)+$\sigma_f h_{BD}$(n)$h_{DU}$(n)s(n))x(n)+noise. This signal, y(n), is shown by reference number 635. As shown, when s(n)=0 (indicated by reference number 640 in the plot shown at reference number 630), the backscatter device 605 may switch off reflection, such that the signal component $\sigma_f h_{BD}$ (n)$h_{DU}$(n)s(n) equals zero, and thus the reader 608 receives only the direct link 620 signal (e.g., y(n)=$h_{BU}$(n)x(n)+noise). When s(n)=1 (indicated by reference number 645 in the plot shown at reference number 630), the backscatter device 605 may switch on reflection, such that signal component $\sigma_f h_{BD}$(n)$h_{DU}$(n)s(n) equals $\sigma_f h_{BD}$(n)$h_{DU}$(n), and thus the reader 608 receives a superposition of both the direct link 620 signal and the backscatter link 615 signal (e.g., y(n)=($h_{BU}$(n)+$\sigma_f h_{BD}$(n)$h_{DU}$(n))x(n)+noise. To receive the information bits transmitted by the backscatter device 605, the reader 608 may first decode x(n) based at least in part on the direct link channel response value of $h_{BU}$(n) by treating the backscatter link 615 signal as interference. The reader 608 may then detect the existence of the signal component $\sigma_f h_{BD}$(n)$h_{DU}$(n)x(n) by subtracting $h_{BU}$(n)x(n) from y(n). In some cases, the backscatter device 605 may not maintain a state from communication session to communication session except of what is stored in the backscatter device 605 memory, such as an electronic product code (EPC) associated with backscatter device 605 or similar information.

Some IoT devices may be referred to as semi-passive IoT devices, because communication between a reader and the IoT device does not need to be preceded by an energy harvesting waveform. For example, semi-passive IoT devices may include a battery or similar energy source that can power the receiver and/or logic circuit. For such devices, energy harvesting may still be triggered in some cases, such as for long-range communications. In such examples, a rectifier circuit of the IoT device may have a warm start from the battery or other energy source, and thus may be associated with a lower minimum received power requirement than passive IoT devices (e.g., −30 dBm rather than −20 dBm). Nonetheless, long-range communications may require battery power spend to energize each decoding. More particularly, for long-range communications in which an energy harvesting rate is lower than a decoding circuit requirement, such as when the energy harvesting rate is below −30 dBm, the semi-passive IoT device may expend battery power to energize each decoding. Thus, continuous IoT device monitoring, such as for purposes of receiving a long-distance query communication, may result in excessive battery drain at the IoT device.

In that regard, passive and semi-passive IoT devices may be inherently limited for certain applications. For example, passive IoT devices, such as the backscatter device 605, may be associated with a low cost and form factor because there is no need for an RF chain at the IoT device. However, these devices require an energy harvesting waveform, limiting the application of such passive IoT devices to short-distance communications. Although semi-passive IoT devices may eliminate the need for an energy harvesting waveform and/or may enable long-distance communications, such devices increase cost and complexity because the devices require the use of a battery or similar energy source. Moreover, because passive and semi-passive devices may be associated with a communication session that is initiated by the RF source, these devices may be inherently limited for use in sensing scenarios or similar latency-critical applications that require aperiodic traffic, and the devices may not scale well for use in high IoT density applications.

In some cases, an ambient IoT device (sometimes referred to as an ultra-light IoT device) may be employed in order to overcome some of the deficiencies of passive and semi-passive IoT devices. An ambient IoT device may be a device that is capable of transmitting an uplink trigger, and thus may initiate a communication session from the IoT device side. For example, an ambient IoT device may be associated with uplink transmissions that do not utilize a PA (e.g., a transmission in the range of 0 to 5 dBm), and for which there is limited transmission capability, such as an ability to simply transmit a preamble transmission to indicate uplink traffic. There remains a need, however, to efficiently support synchronous operation of an ambient IoT device.

Some techniques and apparatuses described herein enable a frame structure to support synchronous operation of an ambient IoT device. In some aspects, the frame structure may include resources associated with a PSS, an SSS, a PBCH, a PDCCH/PDSCH, a PUCCH/PUSCH, and/or an uplink trigger message. For example, the frame structure may include resources associated with the uplink trigger message that occur at a fixed relative location with respect to resources associated with the PSS. In that regard, an ambient IoT device or similar device may acquiring network timing from a PSS and transmit the uplink trigger message to a network device using the resources associated with the uplink trigger message, which may initiate a communication session between the ambient IoT device and the network device. As a result, some techniques and apparatuses described herein enable efficient, synchronous operation of ambient IoT devices, thereby reducing power, computing, and communication resource consumption associated with other IoT devices and/or enabling long-range, high-density IoT device communication.

As indicated above, FIG. 6 is provided as an example. Other examples may differ from what is described with respect to FIG. 6.

Figure 7:
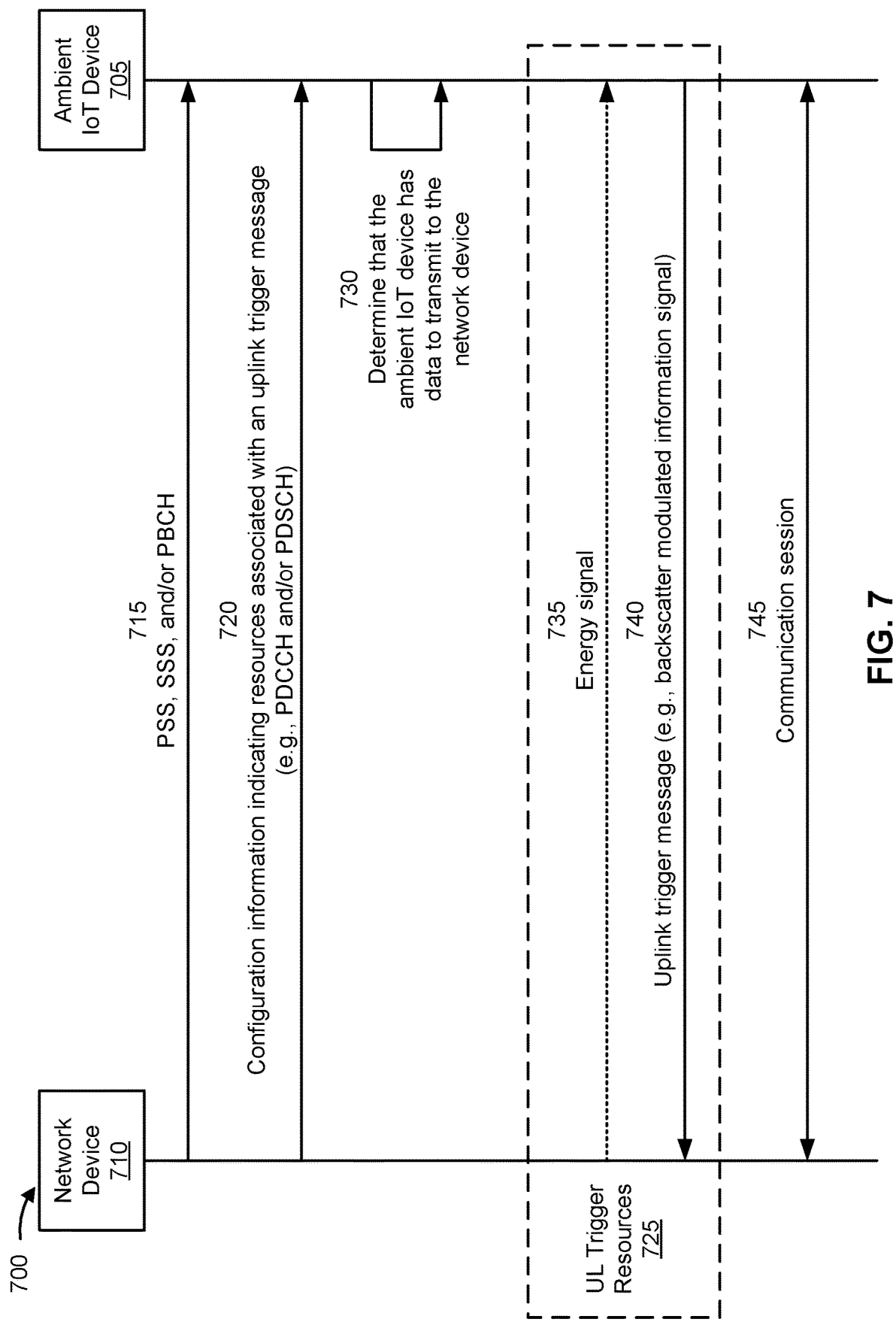
FIG. 7 is a diagram of an example associated with synchronous operation of an ambient Internet-of-Things (IoT) device, in accordance with the present disclosure.

FIG. 7 is a diagram of an example 700 associated with synchronous operation of an ambient IoT device, in accordance with the present disclosure. As shown in FIG. 7, an ambient IoT device 705 (e.g., backscatter device 605, UE 120, or a similar device) may communicate with a network device 710 (e.g., RF source 610, reader 608, network node 110, a CU, a DU, and/or an RU). In some aspects, the ambient IoT device 705 and the network device 710 may be part of a wireless network (e.g., wireless network 100). The ambient IoT device 705 and the network device 710 may have established a wireless connection prior to operations shown in FIG. 7, such as for purposes of establishing a backscatter link 615 or similar link between the ambient IoT device 705 and the network device 710.

As shown by reference number 715, the network device 710 may transmit, and the ambient IoT device 705 may receive, synchronization or similar information. For example, the network device 710 may transmit a PSS, an SSS, and/or information associated with a PBCH. More particularly, the ambient IoT device 705 ultimately may receive configuration information associated with resources for transmitting an uplink trigger message to the network device 710 (which is described in more detail below in connection with reference number 720), and the PSS, the SSS, and/or the PBCH may include timing information or other information for receiving the configuration information. For example, the ambient IoT device 705 may acquire the PSS from the network device 710 and receive configuration information indicating the resources associated with an uplink trigger message based at least in part on timing information indicated by the PSS. In some aspects, based at least in part on the timing information acquired from the PSS, the ambient IoT device may determine a location of resources associated with a PBCH, and the PBCH may indicate resources associated with a downlink channel that may include the configuration information. For example, the ambient IoT device 705 may acquire the PSS, and, based at least in part on the PSS, may determine when to receive the PBCH. The PBCH may in turn include information associated with certain system information (e.g., SIB), including, in some aspects, information associated with a downlink channel (e.g., a PDCCH and/or PDSCH), for obtaining configuration information. The ambient IoT device 705 may thus receive the PDCCH and/or PDSCH at the location indicated by the system information, which may include configuration information specific to the ambient IoT device 705.

More particularly, as shown by reference number 720, the network device 710 may transmit, and the ambient IoT device 705 may receive, configuration information. In some aspects, the ambient IoT device 705 may receive the configuration information via one or more of RRC signaling, one or more MAC control elements (MAC-CEs), and/or DCI, among other examples. In some aspects, the configuration information may include an indication of one or more configuration parameters (e.g., already known to the ambient IoT device 705 and/or previously indicated by the network device 710 or other network device) for selection by the ambient IoT device 705, and/or explicit configuration information for the ambient IoT device 705 to use to configure the ambient IoT device 705, among other examples.

In some aspects, the configuration information may indicate resources associated with an uplink trigger message. For example, the configuration information may indication the uplink (UL) trigger resources 725 shown in FIG. 7. The resources associated with an uplink trigger message (e.g., the UL trigger resources 725) may be associated with resources which the ambient IoT device 705 may use to initiate a communication session between the ambient IoT device 705 and the network device 710. In some aspects, the resources associated with the uplink trigger message may occur at a fixed location relative to another slot and/or communication. For example, the resources associated with the uplink trigger message may occur at a fixed relative location with respect to resources associated with the PSS, such that when the ambient IoT device 705 has data to transmit to the network device 710, the ambient IoT device 705 may trigger a communication session by locating the UL trigger resources 725 relative to the known (e.g., preconfigured) location of the PSS. In some aspects, the configuration information may indicate a particular frame structure that includes the resources associated with the uplink trigger message as well as resources associated with other signals and/or messages, such as synchronization signals (e.g., PSS and/or SSS), broadcast and/or system messages (e.g., PBCH), downlink messages (e.g., PDCCH and/or PDSCH), uplink messages (e.g., PUCCH and/or PUSCH), or similar signals and/or messages, which are described in more detail in connection with the example frame structure shown in FIG. 8.

The ambient IoT device 705 may configure itself based at least in part on the configuration information. In some aspects, the ambient IoT device 705 may be configured to perform one or more operations described herein based at least in part on the configuration information.

As shown by reference number 730, the ambient IoT device 705 may determine that data is to be transmitted to the network device 710. For example, the ambient IoT device 705 may be associated with a sensor or a similar application that may be configured to alert the network device 710 when a reading satisfies a threshold. Accordingly, based at least in part on the sensor reading satisfying the threshold or a similar condition being met, the ambient IoT device 705 may determine that data is to be transmitted to the network device 710.

In some aspects, when the ambient IoT device 705 determines that data is to be sent to the network device 710, the ambient IoT device 705 may utilize the resources associated with the uplink trigger message (e.g., the UL trigger resources 725) to transmit, to the network device 710, the uplink trigger message. A timing of the ambient IoT device 705 may be synchronized with the network device 710, because the UL trigger resources 725 may be provided at a fixed relative location with respect to resources associated with the PSS or other message, as described above in connection with 720. Put another way, a timing of the ambient IoT device 705 may be synchronized with the network device 710 because the UL trigger resources 725 may be provided within a frame structure that fixes a relative location of the UL trigger resources 725 with respect to other resources and/or signals (e.g., a PSS), which is described in more detail below in connection with FIG. 8. In that regard, the ambient IoT device 705 may be configured to transmit an uplink trigger message at a time in which the network device 710 is listening for the uplink trigger message, thereby providing synchronous operation between the ambient IoT device 705 and the network device 710.

In some aspects, the uplink trigger message may be associated with a backscattered communication, which may be transmitted in a similar manner as described above in connection with the signal, y(n), shown by reference number 635 in FIG. 6. In such aspects, the ambient IoT device 705 may be configured to receive an energy harvesting and/or continuous wave from the network device 710, modulate the energy harvesting and/or continuous wave with information bits, and reflect the modulated wave back to the network device 710, in a similar manner as described above in connection with FIG. 6. In such aspects, as shown by reference number 735, the network device 710 may transmit, and the ambient IoT device 705 may receive, an energy signal, which may correspond to the radio wave transmitted by the RF source 610 described in connection with reference number 625. The network device 710 may be configured to periodically transmit the energy signal, such as during each instance of the UL trigger resources 725, such that, if the ambient IoT device 705 needs to transmit an uplink trigger message, the ambient IoT device can harvest the energy signal and backscatter the uplink trigger message accordingly.

As shown by reference number 740, the ambient IoT device 705 may transmit, and the network device 710 may receive, the uplink trigger message. As shown in FIG. 7, the ambient IoT device 705 may transmit the uplink trigger message to the network device 710 using the resources associated with the uplink trigger message (e.g., the UL trigger resources 725). The uplink trigger message may be a message transmitted to the network device 710 that indicates that the ambient IoT device 705 has data to transmit to the network device 710 and/or that otherwise initiates a communication session between the ambient IoT device 705 and the network device 710. Moreover, in aspects in which the ambient IoT device 705 is a backscatter device (e.g., backscatter device 605) and/or in which the uplink trigger message is associated with a backscattered communication, the uplink trigger message may include a backscatter modulated information signal, similar to the signal y(n) shown by reference number 635 in FIG. 6.

In some aspects, the uplink trigger message may be used to initiate a broader communication session between the ambient IoT device 705 and the network device 710. For example, as shown by reference number 745, the ambient IoT device 705 may use the uplink trigger message to initiate a communication session in which sensor data or similar data is transmitted to the network device via a PUSCH or similar channel. In aspects in which the ambient IoT device 705 is a backscatter device (e.g., backscatter device 605) and/or utilizes backscattering to communicate with the network device 710, the network device 710 may transmit multiple energy signals to the ambient IoT device 705 during the communication session, and the ambient IoT device 705 may backscatter data back to the network device 710, in a similar manner as described above in connection with FIG. 6. In some aspects, the communication session may include multiple rounds, such as for purposes of contention resolution when multiple backscatter devices respond to a query. Aspects of an example frame structure that may be used to trigger a communication session between the ambient IoT device 705 and the network device 710 is described in more detail below in connection with FIG. 8.

As indicated above, FIG. 7 is provided as an example. Other examples may differ from what is described with respect to FIG. 7.

Figure 8:
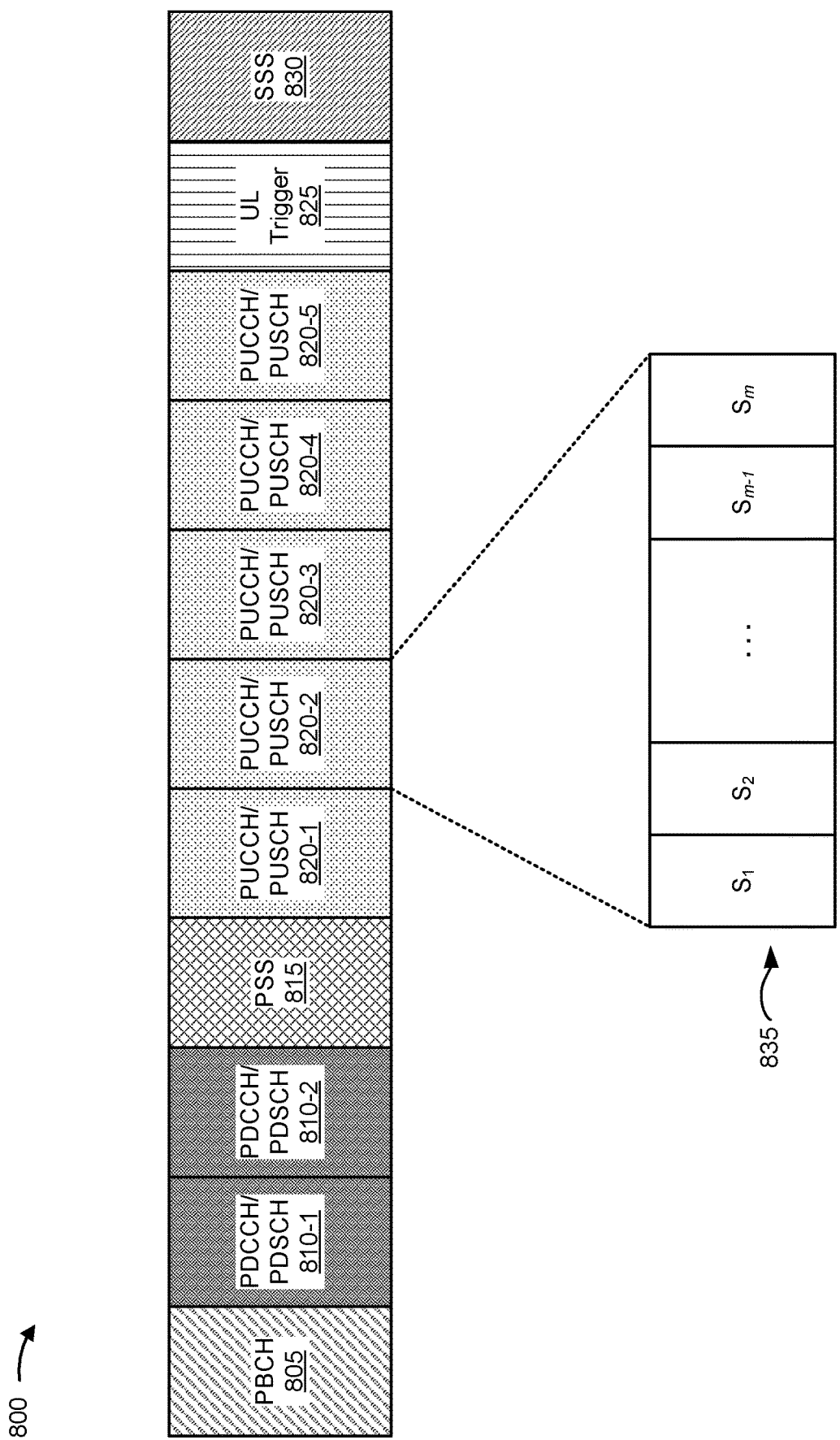
FIG. 8 is a diagram illustrating an example frame structure for synchronous operation of an ambient IoT device, in accordance with the present disclosure.

FIG. 8 is a diagram illustrating an example frame structure 800 for synchronous operation of an ambient IoT device, in accordance with the present disclosure. The example frame structure 800 may be implemented to facilitate communications between an ambient IoT device and a network device (e.g., a reader), such as the ambient IoT device 705 and the network device 710 described above in connection with FIG. 7.

In some aspects, the example frame structure 800 may include resources associated with the uplink trigger message (e.g., the frame structure may support in-band uplink trigger) as well as resources associated with other types of signals and/or messages, such as resources associated with a PSS, an SSS, a PBCH, a PDCCH, a PDSCH, a PUCCH, and/or a PUSCH. In some aspects, the frame structure 800 may include multiple slots, with one or more slots associated with UL trigger resources, a PSS, an SSS, a PBCH, a PDCCH, a PDSCH, a PUCCH, and/or a PUSCH. Additionally, or alternatively, the one or more slots may be arranged relative to one another in order to minimize downlink/uplink switch points. For example, the frame structure 800 may include a PBCH slot 805, a set of one or more downlink slots 810 associated with resources associated with the PDCCH and/or the PDSCH (shown as downlink slots 810-1 and 810-2) following the PBCH slot 805, a PSS slot 815 following the set of one or more downlink slots 810, a set of one or more uplink slots 820 associated with resources associated with the PUCCH and/or the PUSCH (shown as uplink slots 820-1 through 820-5) following the PSS slot 815, a UL trigger slot 825 following the set of one or more uplink slots 820, and/or an SSS slot 830 following the UL trigger slot 825. This structure may reduce switching gaps provided in the frame structure, such as a switching gap provided between the PSS slot 815 and the first uplink slot 820-1. Additionally, or alternatively, the frame structure 800 may further include a guard interval (GI), such as for purposes of handling inter-symbol interference (ISI) in multi-path environments, which is described in more detail below.

In some aspects, certain channels may not be needed and/or otherwise may be omitted from the frame structure 800. For example, in some aspects, an ambient IoT device 705 may not be configured to receive an SSS and/or otherwise may not need an SSS. Accordingly, in some aspects, the resources associated with the SSS (e.g., the SSS slot 830) may be omitted from the frame structure 800. Additionally, or alternatively, a particular mix of the downlink slots 810 and uplink slots 820 may vary and/or may be indicated to the ambient IoT device 705, such as via a slot format indicator (SFI) that indicates a location of the downlink slots 810 and the uplink slots 820 within the frame structure 800. In some aspects, although the mix of downlink slots 810 and uplink slots 820 may be varied through an SF Indication, the relative locations of the other channels and/or resources (e.g., the PBCH slot 805, the PSS slot 815, the UL trigger slot 825, and/or the SSS slot 830) may be fixed.

In some aspects, the location of the UL trigger slot 825 may be fixed relative to a location of the PSS slot 815. This may permit the ambient IoT device 705 to transmit an uplink trigger message (e.g., the uplink trigger message described above in connection with reference number 740) after acquiring timing from the PSS. Additionally, or alternatively, a separation between the PSS slot 815 and the UL trigger slot 825 may be of a sufficient length to permit the ambient IoT device 705 to decode the PSS. In some aspects, as described above in connection with reference numbers 735 and 740, an uplink trigger message may be a backscattered message. Accordingly, the UL trigger slot 825 may be associated with resources in which an energy wave and/or a continuous wave is transmitted by the network device 710, and/or resources in which an uplink trigger message is transmitted by the ambient IoT device 705 by backscattering a continuous wave to the network device 710.

In some aspects, a duration of each slot (e.g., PBCH slot 805, downlink slot 810, PSS slot 815, uplink slot 820, UL trigger slot 825, and/or SSS slot 830) of the frame structure 800 may be a multiple of 1 millisecond (ms), such as for purposes of consistency with NR and/or another wireless communication standard (e.g., a duration of each slot may be a multiple of 1 ms in order to satisfy in-band/guard-band requirements of NR and/or another wireless communication standard). Put another way, in some aspects, the frame structure 800 may include a plurality of slots, with a duration of each slot, of the plurality of slots, being equal to a product of an integer and 1 ms.

In some aspects, the frame structure 800 may be associated with a single-carrier operation and/or a reduced modulation and/or coding as compared to other wireless communication frame structures. For example, the frame structure may be associated with envelope tracking in the downlink (e.g., communications transmitted from the network device 710 to the ambient IoT device 705) and/or backscattering in the uplink (e.g., communications transmitted from the ambient IoT device 705 to the network device 710). Moreover, in some aspects, the frame structure 800 may be associated with a relatively simple modulation, such as binary phase shift keying (BPSK) and/or ASK. In such aspects, a number of bits capable of being transmitted in a slot may thus be limited. For example, a 1 ms slot with fourteen symbols that is associated with BPSK permits only fourteen information bits to be transmitted in a slot. This may be inadequate to send certain types of information. For example, DCI associated with NB-IoT has 23 bits plus a sixteen-bit cyclic redundancy check (CRC), which may be too large to be transmitted within a slot including only fourteen symbols using BPSK or a similar scheme.

Accordingly, the frame structure may be configured to increase an amount of bits that may be transmitted in each slot. More particularly, the frame structure 800 may be associated with a plurality of symbols. For example, as shown by reference number 835, each slot (e.g., the PBCH slot 805, the PSS slot 815, the UL trigger slot 825, and/or the SSS slot 830) of the frame structure 800 may be associated with a plurality of symbols, shown as Si through Sm. In some aspects, as compared to a duration of a symbol associated with a typical NR frame structure, a symbol duration of a symbol associated with the frame structure 800 may be reduced by a factor of y, such that more symbols (and thus more information) may be included in a slot. For example, in a typical NR frame structure, in which each slot is associated with fourteen symbols, a symbol duration may be equal to 1 ms divided by the subcarrier spacing (SCS) used for transmission. More particularly, for a 15 kilohertz (kHz) SCS, the typical symbol duration may be approximately 66.67 microseconds (μs) (e.g., 1 ms/15,000); for a 30 kHz SCS, the typical symbol duration may be approximately 33.33 μs (e.g., 1 ms/30,000); for a 60 kHz SCS, the typical symbol duration may be approximately 16.67 μs (e.g., 1 ms/60,000); for a 120 kHz SCS, the typical symbol duration may be approximately 8.33 μs (e.g., 1 ms/120,000); for a 240 kHz SCS, the typical symbol duration may be approximately 4.17 μs (e.g., 1 ms/240,000); and so forth. In some aspects, the symbols of the frame structure 800 may include each of these typical symbol durations further reduced by a factor of y in order to permit more information bits to be transmitted in a slot (e.g., the symbol duration for SCSs of 15 kHz, 30 kHz, 60 kHz, 120 kHz, and 240 kHz may be approximately 66.67 μs/y, 33.33 μs/y, 16.67 μs/y, 8.33 μs/y, and 4.17 μs/y, respectively). More generally, a duration of each symbol, of the plurality of symbols associated with the frame structure 800, may be equal to 1 ms divided by a product of an SCS used for transmission and an integer (e.g., y), with the integer being greater than one (e.g., symbol duration=1 ms/(SCS×y), with y>1).

As an example, in a single-carrier operation in 180 kHz bandwidth (e.g., a single physical resource block (PRB)), BPSK or double side band (DSB)-ASK modulation can potentially support 1/180 ms (e.g., approximately 5.56 μs) symbol duration. Thus, for a SCS of 15 kHz, a factor of 12 (e.g., y=12) may be used. In this regard, up to 180 information bits may be transmitted in a 1 ms slot (e.g., the frame structure 800 in this example may support a bit rate of 180 kilobits per second (kbps)). In some aspects, multiple channels may be implemented in order to increase a bit rate associated with the ambient IoT device 705 and/or the network device 710. For example, the ambient IoT device 705 may use multiple (e.g., 4) 180 kHz channels in order to increase a bit rate, such as in order to increase a bit rate to 720 kbps. In some aspects, the factor may be increased for other types of modulation. For example, in the above example (e.g., 180 kHz bandwidth), single side band (SSB)-ASK modulation may support a further factor of 2.

In some aspects, such as when the ambient IoT device 705 is utilized in multi-path environments, the frame structure 800 may include a GI (e.g., a space between symbols being transmitted) in order to handle ISI at the ambient IoT device 705. More particularly, the frame structure 800 may include a space between symbol transmissions in order to reduce or eliminate ISI, which may otherwise be caused when echoes (e.g., reflections) from one symbol interfere with another symbol. In some aspects, a GI may be utilized in order to add time between symbol transmissions in order to permit echoes from one symbol to settle out before the next symbol is transmitted. In such aspects, the frame structure 800 may include a similar ratio of GI as found in NR and/or LTE frame structures (e.g., a GI comprises approximately 6.67% of the symbol duration). Returning to the above example of a single-carrier operation in 180 kHz bandwidth with a 15 kHz SCS, if a GI is employed that comprises approximately 6.67% of the symbol duration, up to 168 information bits may be transmitted in a 1 ms slot when using BPSK, DSB-ASK, or a similar modulation (e.g., a supported bit rate may be approximately 168 kbps). In such examples, a single slot may be capable of supporting multiple DCIs, an EPC payload (which may be equal to 96 bits plus overhead), or similar communications.

In some aspects, such as for purposes of increasing a number of information bits that may be transmitted in a single slot, the frame structure 800 may be associated with an increased slot duration as compared to a typical NR frame structure. For example, as described above, the frame structure 800 may include a plurality of slots (e.g., the PBCH slot 805, the PSS slot 815, the UL trigger slot 825, and/or the SSS slot 830), with a duration of each slot, of the plurality of slots, being equal to a product of an integer and 1 ms. In some cases, the integer may be greater than one (e.g., the slot duration may be equal to x×1 ms, with x=2, 3, 4, . . . ) in order to increase the slot duration and thus increase a number of information bits that may be transmitted in each slot. Additionally, or alternatively, the frame structure 800 may include a mix of reduced symbol durations and longer slot durations as compared to typical NR frame structures. More particularly, a slot duration may be equal to a product of a first integer (e.g., x) greater than one and 1 ms, and a symbol duration may be equal to 1 ms divided by a product of an SCS used for transmission and a second integer (e.g., y) greater than one.

In some aspects, a bit encoding associated with the frame structure 800 may be configured to support self-clocking at the ambient IoT device 705. For example, the frame structure may be associated with a self-encoding scheme for downlink communications (e.g., a communication transmitted by the network device 710 and received by the ambient IoT device 705). More particularly, certain backscatter devices and/or passive IoT devices may be associated with a pulse interval encoding (PIE) scheme, which is associated with variable length pulses and thus may be ill-suited for synchronous operation of an ambient IoT device 705 and/or for use with the frame structure 800 having a fixed slot length. Accordingly, in some aspects, a Manchester coding scheme, such as a Manchester-L encoding scheme (sometimes referred to as a bi-phase-L encoding scheme) may be employed for downlink communications to enable self-clocking at the ambient IoT device 705.

Additionally, or alternatively, the frame structure 800 may be associated with an encoding scheme for uplink communications that may minimize interference from the network device 710's own continuous wave during decoding of an uplink communication (e.g., a backscattered message). More particularly, during decoding of a backscattered message, a reader (e.g., the network device 710) may filter the continuous wave generated by the RF source from the backscattered communication, as described above in connection with FIG. 6. In some aspects, the frame structure 800 may be associated with an uplink encoding scheme that minimizes the interference caused by the RF source's continuous wave and thus eases filtering of the continuous wave during decoding of the backscattered message. For example, the frame structure 800 may be associated with one of a Miller encoding scheme (sometimes referred to as a delay encoding scheme) or an FM0 encoding scheme (sometimes referred to a bi-phase space encoding scheme). In some aspects, the frame structure 800 may be associated with multiple encoding schemes. For example, downlink communications may be encoded using a Manchester encoding scheme, and uplink communications (e.g., the uplink trigger message) may be encoded using a Miller encoding scheme or an FM0 encoding scheme.

Based at least in part on the ambient IoT device 705 and/or the network device 710 operating in a synchronous fashion as described above in connection with FIGS. 7 and 8, the ambient IoT device 705 and/or the network device 710 may conserve computing, power, network, and/or communication resources that may have otherwise been consumed operating in an asynchronous manner. For example, based at least in part on the ambient IoT device 705 and/or the network device 710 operating in a synchronous fashion, the ambient IoT device 705 and/or the network device 710 may communicate with a reduced error rate, which may conserve computing, power, network, and/or communication resources that may have otherwise been consumed to detect and/or correct communication errors.

As indicated above, FIG. 8 is provided as an example. Other examples may differ from what is described with respect to FIG. 8.

Figure 9:
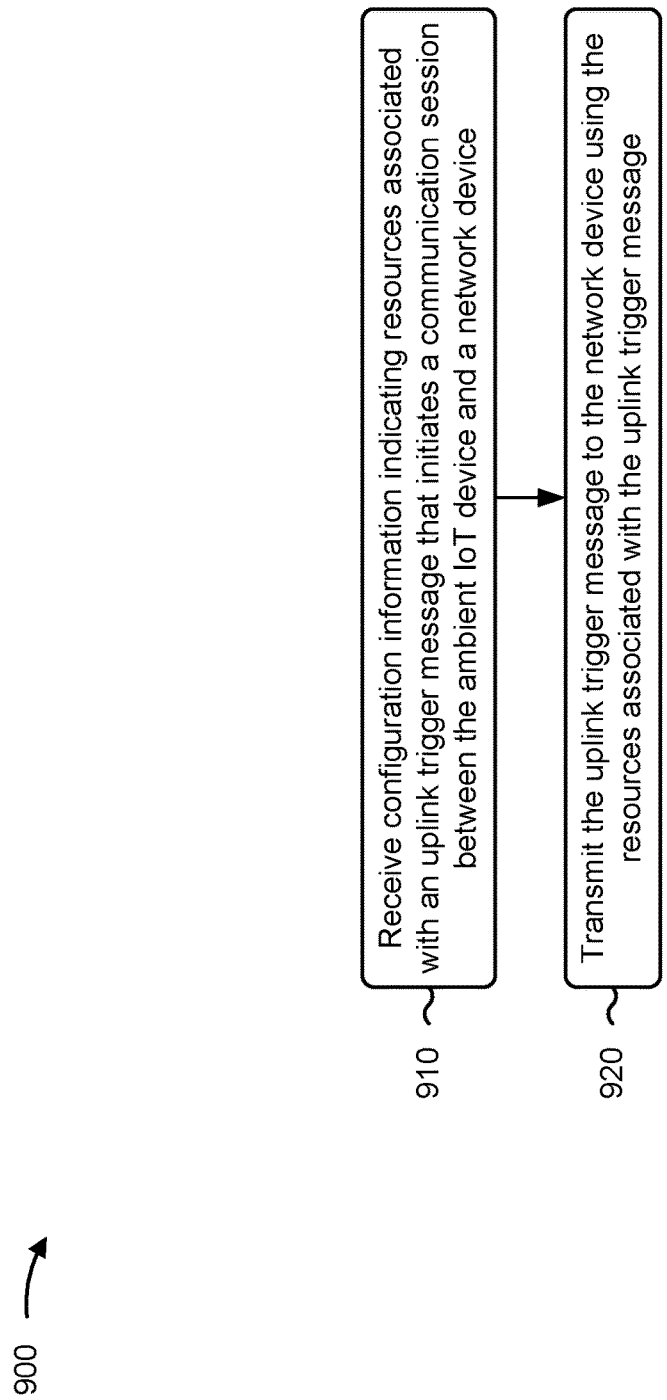
FIG. 9 is a diagram illustrating an example process performed, for example, by an ambient IoT device, in accordance with the present disclosure.

FIG. 9 is a diagram illustrating an example process 900 performed, for example, by an ambient IoT device, in accordance with the present disclosure. Example process 900 is an example where the ambient IoT device (e.g., ambient IoT device 705) performs operations associated with a frame structure for synchronous operation of an ambient IoT device.

As shown in FIG. 9, in some aspects, process 900 may include receiving configuration information indicating resources associated with an uplink trigger message that initiates a communication session between the ambient IoT device and a network device (block 910). For example, the ambient IoT device (e.g., using reception component 1102 and/or communication manager 1106, depicted in FIG. 11) may receive configuration information indicating resources associated with an uplink trigger message that initiates a communication session between the ambient IoT device and a network device, as described above.

As further shown in FIG. 9, in some aspects, process 900 may include transmitting the uplink trigger message to the network device using the resources associated with the uplink trigger message (block 920). For example, the ambient IoT device (e.g., using transmission component 1104 and/or communication manager 1106, depicted in FIG. 11) may transmit the uplink trigger message to the network device using the resources associated with the uplink trigger message, as described above.

Process 900 may include additional aspects, such as any single aspect or any combination of aspects described below and/or in connection with one or more other processes described elsewhere herein.

In a first aspect, process 900 includes acquiring a PSS from the network device, wherein receiving the configuration information indicating the resources associated with the uplink trigger message is based at least in part on timing information indicated by the PSS.

In a second aspect, alone or in combination with the first aspect, the resources associated with the uplink trigger message occur at a fixed relative location with respect to resources associated with a primary synchronization signal.

In a third aspect, alone or in combination with one or more of the first and second aspects, the uplink trigger message is transmitted by backscattering a continuous wave transmitted by the network device.

In a fourth aspect, alone or in combination with one or more of the first through third aspects, the resources associated with the uplink trigger message are associated with a frame structure, and the frame structure further includes resources associated with at least one of a PSS, an SSS, a PBCH, a PDCCH, a PDSCH, a PUCCH, or a PUSCH.

In a fifth aspect, alone or in combination with one or more of the first through fourth aspects, the frame structure includes a first slot associated with resources associated with the PBCH, a second slot associated with resources associated with the PSS, a third slot associated with resources associated with the uplink trigger message, and a fourth slot associated with resources associated with the SSS.

In a sixth aspect, alone or in combination with one or more of the first through fifth aspects, the frame structure further includes a first set of one or more slots associated with resources associated with at least one of the PDCCH or the PDSCH, and a second set of one or more slots associated with resources associated with at least one of the PUCCH or the PUSCH.

In a seventh aspect, alone or in combination with one or more of the first through sixth aspects, process 900 includes receiving a slot format indicator that indicates a location of the first set of one or more slots and the second set of one or more slots within the frame structure.

In an eighth aspect, alone or in combination with one or more of the first through seventh aspects, the frame structure includes a plurality of slots, and a duration of each slot, of the plurality of slots, is equal to a product of an integer and one millisecond.

In a ninth aspect, alone or in combination with one or more of the first through eighth aspects, the integer is greater than one.

In a tenth aspect, alone or in combination with one or more of the first through ninth aspects, the frame structure is associated with a plurality of symbols, a duration of each symbol, of the plurality of symbols, is equal to one millisecond divided by a product of a subcarrier spacing used for transmission and an integer, and the integer is greater than one.

In an eleventh aspect, alone or in combination with one or more of the first through tenth aspects, the frame structure is associated with a plurality of slots and a plurality of symbols, a duration of each slot, of the plurality of slots, is equal to a product of a first integer greater than one and one millisecond, and a duration of each symbol, of the plurality of symbols, is equal to one millisecond divided by a product of a subcarrier spacing used for transmission and a second integer greater than one.

In a twelfth aspect, alone or in combination with one or more of the first through eleventh aspects, the frame structure includes a guard interval between symbol transmissions associated with the frame structure.

In a thirteenth aspect, alone or in combination with one or more of the first through twelfth aspects, process 900 includes receiving a downlink communication from the network device, wherein the downlink communication is encoded using a self-clocking encoding scheme.

In a fourteenth aspect, alone or in combination with one or more of the first through thirteenth aspects, the downlink communication is encoded using a Manchester encoding scheme, and the uplink trigger message is encoded using one of a Miller encoding scheme or an FM0 encoding scheme.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
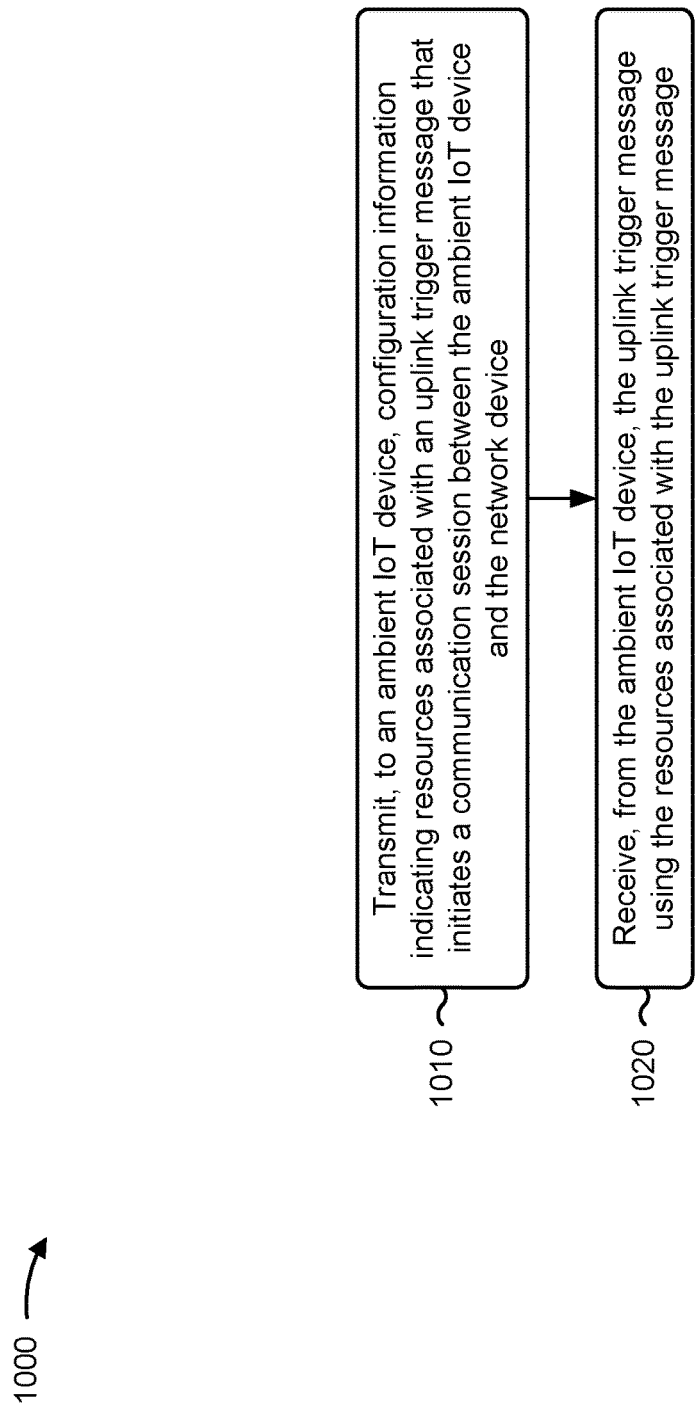
FIG. 10 is a diagram illustrating an example process performed, for example, by a network device, in accordance with the present disclosure.

FIG. 10 is a diagram illustrating an example process 1000 performed, for example, by a network device, in accordance with the present disclosure. Example process 1000 is an example where the network device (e.g., network device 710) performs operations associated with a frame structure for synchronous operation of an ambient internet of things device.

As shown in FIG. 10, in some aspects, process 1000 may include transmitting, to an ambient IoT device, configuration information indicating resources associated with an uplink trigger message that initiates a communication session between the ambient IoT device and the network device (block 1010). For example, the network device (e.g., using transmission component 1204 and/or communication manager 1206, depicted in FIG. 12) may transmit, to an ambient IoT device, configuration information indicating resources associated with an uplink trigger message that initiates a communication session between the ambient IoT device and the network device, as described above.

As further shown in FIG. 10, in some aspects, process 1000 may include receiving, from the ambient IoT device, the uplink trigger message using the resources associated with the uplink trigger message (block 1020). For example, the network device (e.g., using reception component 1202 and/or communication manager 1206, depicted in FIG. 12) may receive, from the ambient IoT device, the uplink trigger message using the resources associated with the uplink trigger message, as described above.

Process 1000 may include additional aspects, such as any single aspect or any combination of aspects described below and/or in connection with one or more other processes described elsewhere herein.

In a first aspect, process 1000 includes transmitting, to the ambient IoT device, a PSS, wherein transmitting the configuration information indicating the resources associated with the uplink trigger message is based at least in part on timing information indicated by the PSS.

In a second aspect, alone or in combination with the first aspect, the resources associated with the uplink trigger message occur at a fixed relative location with respect to resources associated with a primary synchronization signal.

In a third aspect, alone or in combination with one or more of the first and second aspects, process 1000 includes transmitting a continuous wave to the ambient IoT device, wherein the uplink trigger message is received via a backscattered communication associated with the continuous wave.

In a fourth aspect, alone or in combination with one or more of the first through third aspects, the resources associated with the uplink trigger message are associated with a frame structure, and the frame structure further includes resources associated with at least one of a PSS, an SSS, a PBCH, a PDCCH, a PDSCH, a PUCCH, or a PUSCH.

In a fifth aspect, alone or in combination with one or more of the first through fourth aspects, the frame structure includes a first slot associated with resources associated with the PBCH, a second slot associated with resources associated with the PSS, a third slot associated with resources associated with the uplink trigger message, and a fourth slot associated with resources associated with the SSS.

In a sixth aspect, alone or in combination with one or more of the first through fifth aspects, the frame structure further includes a first set of one or more slots associated with resources associated with at least one of the PDCCH or the PDSCH, and a second set of one or more slots associated with resources associated with at least one of the PUCCH or the PUSCH.

In a seventh aspect, alone or in combination with one or more of the first through sixth aspects, process 1000 includes transmitting a slot format indicator that indicates a location of the first set of one or more slots and the second set of one or more slots within the frame structure.

In an eighth aspect, alone or in combination with one or more of the first through seventh aspects, the frame structure includes a plurality of slots, and a duration of each slot, of the plurality of slots, is equal to a product of an integer and one millisecond.

In a ninth aspect, alone or in combination with one or more of the first through eighth aspects, the integer is greater than one.

In a tenth aspect, alone or in combination with one or more of the first through ninth aspects, the frame structure is associated with a plurality of symbols, a duration of each symbol, of the plurality of symbols, is equal to one millisecond divided by a product of a subcarrier spacing used for transmission and an integer, and the integer is greater than one.

In an eleventh aspect, alone or in combination with one or more of the first through tenth aspects, the frame structure is associated with a plurality of slots and a plurality of symbols, a duration of each slot, of the plurality of slots, is equal to a product of first integer greater than one and one millisecond, and a duration of each symbol, of the plurality of symbols, is equal to one millisecond divided by a product of a subcarrier spacing used for transmission and a second integer greater than one.

In a twelfth aspect, alone or in combination with one or more of the first through eleventh aspects, the frame structure includes a guard interval between symbol transmissions.

In a thirteenth aspect, alone or in combination with one or more of the first through twelfth aspects, process 1000 includes transmitting, to the ambient IoT device, a downlink communication, wherein the downlink communication is encoded using a self-clocking encoding scheme.

In a fourteenth aspect, alone or in combination with one or more of the first through thirteenth aspects, the downlink communication is encoded using a Manchester encoding scheme, and the uplink trigger message is encoded using one of a Miller encoding scheme or an FM0 encoding scheme.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
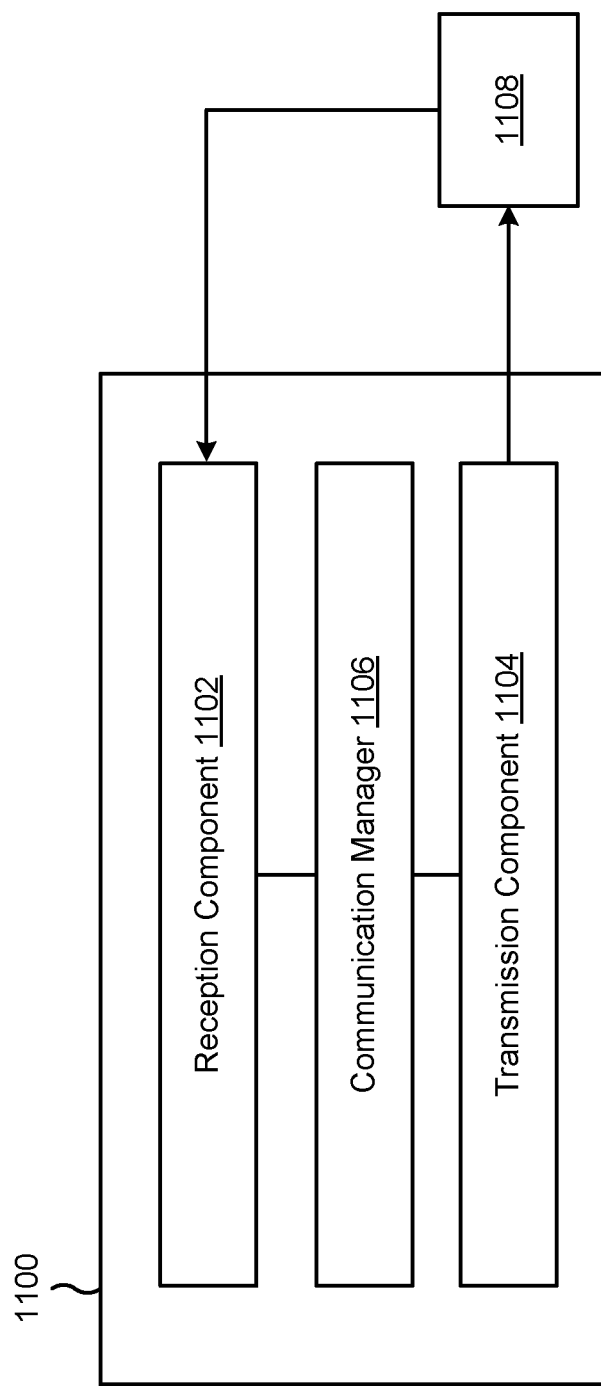
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be an ambient IoT device (e.g., ambient IoT device 705), or a ambient IoT device may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE 120 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE 120 described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE 120 described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive configuration information indicating resources associated with an uplink trigger message that initiates a communication session between the ambient IoT device and a network device. The transmission component 1104 may transmit the uplink trigger message to the network device using the resources associated with the uplink trigger message.

The communication manager 1106 may acquire a PSS from the network device, wherein receiving the configuration information indicating the resources associated with the uplink trigger message is based at least in part on timing information indicated by the PSS.

The reception component 1102 may receive a slot format indicator that indicates a location of the first set of one or more slots and the second set of one or more slots within the frame structure.

The reception component 1102 may receive a downlink communication from the network device, wherein the downlink communication is encoded using a self-clocking encoding scheme.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
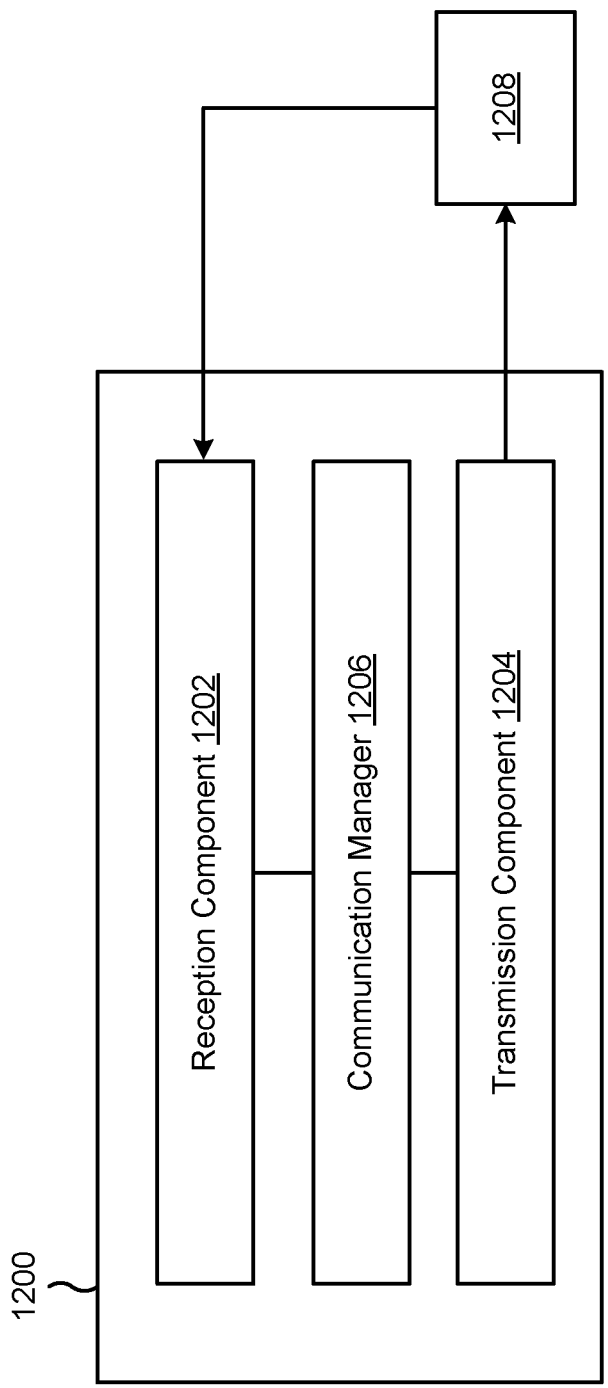
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network device (e.g., network device 710), or a network device may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node 110 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node 110 described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node 110 described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, to an ambient IoT device, configuration information indicating resources associated with an uplink trigger message that initiates a communication session between the ambient IoT device and the network device. The reception component 1202 may receive, from the ambient IoT device, the uplink trigger message using the resources associated with the uplink trigger message.

The transmission component 1204 may transmit, to the ambient IoT device, a PSS, wherein transmitting the configuration information indicating the resources associated with the uplink trigger message is based at least in part on timing information indicated by the PSS.

The transmission component 1204 may transmit a continuous wave to the ambient IoT device, wherein the uplink trigger message is received via a backscattered communication associated with the continuous wave.

The transmission component 1204 may transmit a slot format indicator that indicates a location of the first set of one or more slots and the second set of one or more slots within the frame structure.

The transmission component 1204 may transmit, to the ambient IoT device, a downlink communication, wherein the downlink communication is encoded using a self-clocking encoding scheme.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by an ambient IoT device, comprising: receiving configuration information indicating resources associated with an uplink trigger message that initiates a communication session between the ambient IoT device and a network device; and transmitting the uplink trigger message to the network device using the resources associated with the uplink trigger message.

Aspect 2: The method of Aspect 1, further comprising acquiring a PSS from the network device, wherein receiving the configuration information indicating the resources associated with the uplink trigger message is based at least in part on timing information indicated by the PSS.

Aspect 3: The method of any of Aspects 1-2, wherein the resources associated with the uplink trigger message occur at a fixed relative location with respect to resources associated with a primary synchronization signal.

Aspect 4: The method of any of Aspects 1-3, wherein the uplink trigger message is transmitted by backscattering a continuous wave transmitted by the network device.

Aspect 5: The method of any of Aspects 1-4, wherein the resources associated with the uplink trigger message are associated with a frame structure, wherein the frame structure further includes resources associated with at least one of: a PSS, an SSS, a PBCH, a PDCCH, a PDSCH, a PUCCH, or a PUSCH.

Aspect 6: The method of Aspect 5, wherein the frame structure includes: a first slot associated with resources associated with the PBCH, a second slot associated with resources associated with the PSS, a third slot associated with resources associated with the uplink trigger message, and a fourth slot associated with resources associated with the SSS.

Aspect 7: The method of Aspect 6, wherein the frame structure further includes: a first set of one or more slots associated with resources associated with at least one of the PDCCH or the PDSCH, and a second set of one or more slots associated with resources associated with at least one of the PUCCH or the PUSCH.

Aspect 8: The method of Aspect 7, further comprising receiving a slot format indicator that indicates a location of the first set of one or more slots and the second set of one or more slots within the frame structure.

Aspect 9: The method of any of Aspects 5-8, wherein the frame structure includes a plurality of slots, and wherein a duration of each slot, of the plurality of slots, is equal to a product of an integer and one millisecond.

Aspect 10: The method of Aspect 9, wherein the integer is greater than one.

Aspect 11: The method of any of Aspects 5-10, wherein the frame structure is associated with a plurality of symbols, wherein a duration of each symbol, of the plurality of symbols, is equal to one millisecond divided by a product of a subcarrier spacing used for transmission and an integer, and wherein the integer is greater than one.

Aspect 12: The method of any of Aspects 5-11, wherein the frame structure is associated with a plurality of slots and a plurality of symbols, wherein a duration of each slot, of the plurality of slots, is equal to a product of first integer greater than one and one millisecond, and wherein a duration of each symbol, of the plurality of symbols, is equal to one millisecond divided by a product of a subcarrier spacing used for transmission and a second integer greater than one.

Aspect 13: The method of any of Aspects 5-12, wherein the frame structure includes a guard interval between symbol transmissions associated with the frame structure.

Aspect 14: The method of any of Aspects 1-13, further comprising receiving a downlink communication from the network device, wherein the downlink communication is encoded using a self-clocking encoding scheme.

Aspect 15: The method of Aspect 14, wherein the downlink communication is encoded using a Manchester encoding scheme, and wherein the uplink trigger message is encoded using one of a Miller encoding scheme or an FM0 encoding scheme.

Aspect 16: A method of wireless communication performed by a network device, comprising: transmitting, to an ambient IoT device, configuration information indicating resources associated with an uplink trigger message that initiates a communication session between the ambient IoT device and the network device; and receiving, from the ambient IoT device, the uplink trigger message using the resources associated with the uplink trigger message.

Aspect 17: The method of Aspect 16, further comprising transmitting, to the ambient IoT device, a PSS, wherein transmitting the configuration information indicating the resources associated with the uplink trigger message is based at least in part on timing information indicated by the PSS.

Aspect 18: The method of any of Aspects 16-17, wherein the resources associated with the uplink trigger message occur at a fixed relative location with respect to resources associated with a primary synchronization signal.

Aspect 19: The method of any of Aspects 16-18, further comprising transmitting a continuous wave to the ambient IoT device, wherein the uplink trigger message is received via a backscattered communication associated with the continuous wave.

Aspect 20: The method of any of Aspects 16-19, wherein the resources associated with the uplink trigger message are associated with a frame structure, wherein the frame structure further includes resources associated with at least one of: a PSS, an SSS, a PBCH, a PDCCH, a PDSCH, a PUCCH, or a PUSCH.

Aspect 21: The method of Aspect 20, wherein the frame structure includes: a first slot associated with resources associated with the PBCH, a second slot associated with resources associated with the PSS, a third slot associated with resources associated with the uplink trigger message, and a fourth slot associated with resources associated with the SSS.

Aspect 22: The method of Aspect 21, wherein the frame structure further includes: a first set of one or more slots associated with resources associated with at least one of the PDCCH or the PDSCH, and a second set of one or more slots associated with resources associated with at least one of the PUCCH or the PUSCH.

Aspect 23: The method of Aspect 22, further comprising transmitting a slot format indicator that indicates a location of the first set of one or more slots and the second set of one or more slots within the frame structure.

Aspect 24: The method of any of Aspects 20-23, wherein the frame structure includes a plurality of slots, and wherein a duration of each slot, of the plurality of slots, is equal to a product of an integer and one millisecond.

Aspect 25: The method of Aspect 24, wherein the integer is greater than one.

Aspect 26: The method of any of Aspects 20-25, wherein the frame structure is associated with a plurality of symbols, wherein a duration of each symbol, of the plurality of symbols, is equal to one millisecond divided by a product of a subcarrier spacing used for transmission and an integer, and wherein the integer is greater than one.

Aspect 27: The method of any of Aspects 20-26, wherein the frame structure is associated with a plurality of slots and a plurality of symbols, wherein a duration of each slot, of the plurality of slots, is equal to a product of first integer greater than one and one millisecond, and wherein a duration of each symbol, of the plurality of symbols, is equal to one millisecond divided by a product of a subcarrier spacing used for transmission and a second integer greater than one.

Aspect 28: The method of any of Aspects 20-27, wherein the frame structure includes a guard interval between symbol transmissions.

Aspect 29: The method of any of Aspects 16-28, further comprising transmitting, to the ambient IoT device, a downlink communication, wherein the downlink communication is encoded using a self-clocking encoding scheme.

Aspect 30: The method of Aspect 29, wherein the downlink communication is encoded using a Manchester encoding scheme, and wherein the uplink trigger message is encoded using one of a Miller encoding scheme or an FM0 encoding scheme.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by an ambient Internet-of-Things (IoT) device, comprising:
   receiving configuration information indicating resources associated with an uplink trigger message that initiates a communication session between the ambient IoT device and a network device, wherein the resources associated with the uplink trigger message are associated with a frame structure that includes:
       a first slot associated with resources associated with a physical broadcast channel (PBCH);
       a second slot after the first slot, the second slot associated with resources associated with a primary synchronization signal (PSS); and
       a third slot after the second slot, the third slot associated with the resources associated with the uplink trigger message; and
   transmitting the uplink trigger message to the network device using the resources associated with the uplink trigger message.

2. The method of claim 1, further comprising acquiring the PSS from the network device, wherein receiving the configuration information indicating the resources associated with the uplink trigger message is based at least in part on timing information indicated by the PSS.

3. The method of claim 1, wherein the resources associated with the uplink trigger message occur at a fixed relative location with respect to resources associated with a primary synchronization signal.

4. The method of claim 1, wherein the uplink trigger message is transmitted by backscattering a continuous wave transmitted by the network device.

5. The method of claim 1, wherein the frame structure further includes resources associated with at least one of:
   a primary synchronization signal (PSS),
   a secondary synchronization signal (SSS),
   a physical broadcast channel (PBCH),
   a physical downlink control channel (PDCCH),
   a physical downlink shared channel (PDSCH),
   a physical uplink control channel (PUCCH), or
   a physical uplink shared channel (PUSCH).

6. The method of claim 5, wherein the frame structure further includes:
   a fourth slot associated with resources associated with the SSS.

7. The method of claim 6, wherein the frame structure further includes:
   a first set of one or more slots associated with resources associated with at least one of the PDCCH or the PDSCH, and
   a second set of one or more slots associated with resources associated with at least one of the PUCCH or the PUSCH.

8. The method of claim 7, further comprising receiving a slot format indicator that indicates a location of the first set of one or more slots and the second set of one or more slots within the frame structure.

9. The method of claim 5, wherein the frame structure includes a plurality of slots, and wherein a duration of each slot, of the plurality of slots, is equal to a product of an integer and one millisecond.

10. The method of claim 9, wherein the integer is greater than one.

11. The method of claim 5, wherein the frame structure is associated with a plurality of symbols, wherein a duration of each symbol, of the plurality of symbols, is equal to one millisecond divided by a product of a subcarrier spacing used for transmission and an integer, and wherein the integer is greater than one.

12. The method of claim 5, wherein the frame structure is associated with a plurality of slots and a plurality of symbols, wherein a duration of each slot, of the plurality of slots, is equal to a product of first integer greater than one and one millisecond, and wherein a duration of each symbol, of the plurality of symbols, is equal to one millisecond divided by a product of a subcarrier spacing used for transmission and a second integer greater than one.

13. The method of claim 5, wherein the frame structure includes a guard interval between symbol transmissions associated with the frame structure.

14. The method of claim 1, further comprising receiving a downlink communication from the network device, wherein the downlink communication is encoded using a self-clocking encoding scheme.

15. The method of claim 14, wherein the downlink communication is encoded using a Manchester encoding scheme, and wherein the uplink trigger message is encoded using one of a Miller encoding scheme or an FM0 encoding scheme.

16. A method of wireless communication performed by a network device, comprising:
transmitting, to an ambient Internet-of-Things (IoT) device, configuration information indicating resources associated with an uplink trigger message that initiates a communication session between the ambient IoT device and the network device, wherein the resources associated with the uplink trigger message are associated with a frame structure that includes:
a first slot associated with resources associated with a physical broadcast channel (PBCH);
a second slot after the first slot, the second slot associated with resources associated with a primary synchronization signal (PSS); and
a third slot after the second slot, the third slot associated with the resources associated with the uplink trigger message; and
receiving, from the ambient IoT device, the uplink trigger message using the resources associated with the uplink trigger message.

17. The method of claim 16, further comprising transmitting, to the ambient IoT device, the PSS, wherein transmitting the configuration information indicating the resources associated with the uplink trigger message is based at least in part on timing information indicated by the PSS.

18. The method of claim 16, wherein the resources associated with the uplink trigger message occur at a fixed relative location with respect to resources associated with a primary synchronization signal.

19. The method of claim 16, further comprising transmitting a continuous wave to the ambient IoT device, wherein the uplink trigger message is received via a backscattered communication associated with the continuous wave.

20. The method of claim 16, wherein the frame structure further includes resources associated with at least one of:
a secondary synchronization signal (SSS),
a physical downlink control channel (PDCCH),
a physical downlink shared channel (PDSCH),
a physical uplink control channel (PUCCH), or
a physical uplink shared channel (PUSCH).

21. The method of claim 20, wherein the frame structure includes a plurality of slots, and wherein a duration of each slot, of the plurality of slots, is equal to a product of an integer and one millisecond.

22. The method of claim 21, wherein the integer is greater than one.

23. The method of claim 20, wherein the frame structure is associated with a plurality of symbols, wherein a duration of each symbol, of the plurality of symbols, is equal to one millisecond divided by a product of a subcarrier spacing used for transmission and an integer, and wherein the integer is greater than one.

24. The method of claim 20, wherein the frame structure is associated with a plurality of slots and a plurality of symbols, wherein a duration of each slot, of the plurality of slots, is equal to a product of first integer greater than one and one millisecond, and wherein a duration of each symbol, of the plurality of symbols, is equal to one millisecond divided by a product of a subcarrier spacing used for transmission and a second integer greater than one.

25. The method of claim 20, wherein the frame structure includes a guard interval between symbol transmissions.

26. An ambient Internet-of-Things (IoT) device for wireless communication, comprising:
one or more memories; and
one or more processors coupled to the one or more memories, the one or more memories storing instructions configurable to be executed by the one or more processors to cause the ambient IoT device to:
receive configuration information indicating resources associated with an uplink trigger message that initiates a communication session between the ambient IoT device and a network device, wherein the resources associated with the uplink trigger message are associated with a frame structure that includes:
a first slot associated with resources associated with a physical broadcast channel (PBCH);
a second slot after the first slot, the second slot associated with resources associated with a primary synchronization signal (PSS); and
a third slot after the second slot, the third slot associated with the resources associated with the uplink trigger message; and
transmit the uplink trigger message to the network device using the resources associated with the uplink trigger message.

27. The ambient IoT device of claim 26, wherein the one or more memories further store instructions configurable to be executed by the one or more processors to cause the ambient IoT device to acquire the PSS from the network device, wherein receiving the configuration information indicating the resources associated with the uplink trigger message is based at least in part on timing information indicated by the PSS.

28. The ambient IoT device of claim 26, wherein the resources associated with the uplink trigger message occur at a fixed relative location with respect to resources associated with a primary synchronization signal.

29. A network device for wireless communication, comprising:
one or more memories; and one or more processors coupled to the one or more memories, the one or more memories storing instructions configurable to be executed by the one or more processors to cause the network device to:

transmit, to an ambient Internet-of-Things (IoT) device, configuration information indicating resources associated with an uplink trigger message that initiates a communication session between the ambient IoT device and the network device, wherein the resources associated with the uplink trigger message are associated with a frame structure that includes:
- a first slot associated with resources associated with a physical broadcast channel (PBCH);
- a second slot after the first slot, the second slot associated with resources associated with a primary synchronization signal (PSS); and
- a third slot after the second slot, the third slot associated with the resources associated with the uplink trigger message; and receive, from the ambient IoT device, the uplink trigger message using the resources associated with the uplink trigger message.

30. The network device of claim 29, wherein the one or more memories further store instructions configurable to be executed by the one or more processors to cause the network device to transmit, to the ambient IoT device, the PSS, wherein transmitting the configuration information indicating the resources associated with the uplink trigger message is based at least in part on timing information indicated by the PSS.

* * * * *